US012508582B2

United States Patent
Du et al.

(10) Patent No.: US 12,508,582 B2
(45) Date of Patent: Dec. 30, 2025

(54) TUNGSTEN-CONTAINING BULK CATALYSTS, METHOD OF MAKING THE SAME, AND THEIR USE IN LOW PRESSURE DIESEL HYDROPROCESSING

(71) Applicant: EXXONMOBIL TECHNOLOGY AND ENGINEERING COMPANY, Annandale, NJ (US)

(72) Inventors: Yi Du, Annandale, NJ (US); Bradley D. Wooler, Annandale, NJ (US); Stuart L. Soled, Annandale, NJ (US); Sabato Miseo, Annandale, NJ (US); Xiaochun Xu, Annandale, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 123 days.

(21) Appl. No.: 18/041,519

(22) PCT Filed: Aug. 19, 2020

(86) PCT No.: PCT/US2020/046893
§ 371 (c)(1),
(2) Date: Feb. 13, 2023

(87) PCT Pub. No.: WO2022/039730
PCT Pub. Date: Feb. 24, 2022

(65) Prior Publication Data
US 2023/0398528 A1  Dec. 14, 2023

(51) Int. Cl.
*B01J 31/18* (2006.01)
*B01J 23/84* (2006.01)
(Continued)

(52) U.S. Cl.
CPC .......... *B01J 31/1805* (2013.01); *B01J 27/02* (2013.01); *B01J 35/70* (2024.01); *B01J 37/04* (2013.01);
(Continued)

(58) Field of Classification Search
None
See application file for complete search history.

(56) References Cited

U.S. PATENT DOCUMENTS

2016/0121294 A1  5/2016  Jia et al.

FOREIGN PATENT DOCUMENTS

| EP | 2 540 392 A1 | 1/2013 |
| EP | 3 275 539 A1 | 1/2018 |
| WO | 00/42120 A1 | 7/2000 |

OTHER PUBLICATIONS

International Search Report and Written Opinion received for PCT Patent Application No. PCT/US2020/046893, mailed on Apr. 28, 2021, 12 pages.
(Continued)

*Primary Examiner* — Daniel Berns
(74) *Attorney, Agent, or Firm* — Shook, Hardy & Bacon L.L.P.

(57) ABSTRACT

Compositions can include compounds having a formula: $Co_y W_{1-x} M_x O_4$ (I), wherein M is Mo, V, or Nb; $0.5 \geq x \geq 0$; and $1 < y \leq 4$; and wherein the compound has an X-ray powder diffraction pattern including characteristic diffraction peaks having d-spacing values of about 2.90 Å, 2.56 Å, and 1.73 Å. Methods can include making a bulk catalyst composition including (i) combining tungstic acid and cobalt carbonate and (ii) reacting the tungstic acid and cobalt carbonate to form a catalyst composition, wherein the cobalt carbonate has an X-ray powder diffraction pattern including charac-
(Continued)

teristic diffraction peaks having d-spacing values of about 10.03 Å, 5.91 Å, 4.35 Å, and 4.21 Å.

19 Claims, 13 Drawing Sheets

(51) Int. Cl.
  *B01J 23/88* (2006.01)
  *B01J 27/02* (2006.01)
  *B01J 35/70* (2024.01)
  *B01J 37/04* (2006.01)
  *B01J 37/20* (2006.01)
  *C07C 5/02* (2006.01)
  *C10G 45/08* (2006.01)

(52) U.S. Cl.
  CPC .............. *B01J 37/20* (2013.01); *C07C 5/02* (2013.01); *B01J 2231/641* (2013.01); *B01J 2235/15* (2024.01); *B01J 2531/0222* (2013.01); *B01J 2531/64* (2013.01); *B01J 2531/66* (2013.01); *B01J 2531/845* (2013.01); *C07C 2523/84* (2013.01)

(56) References Cited

OTHER PUBLICATIONS

International Preliminary Report on Patentability received for PCT Application No. PCT/US2020/046893, mailed on Mar. 2, 2023, 8 pages.
Salamanca, M., et al., "Hydrothermal synthesis of new wolframite type trimetallic materials and their use in oxidative dehydrogenation of propane", Physical Chemistry Chemical Physics, vol. 11, No. 41, pp. 9583-9591 (2009).

TUNGSTEN-CONTAINING BULK CATALYSTS, METHOD OF MAKING THE SAME, AND THEIR USE IN LOW PRESSURE DIESEL HYDROPROCESSING

FIELD OF THE INVENTION

This application relates to tungsten-containing bulk catalyst compositions, methods of making these bulk catalyst compositions, and use of bulk catalyst compositions for hydroprocessing of a hydrocarbon feedstock, which can include hydrodesulfurization and/or hydrodenitrogenation.

BACKGROUND OF THE INVENTION

The discharge into the atmosphere of sulfur compounds during processing and end-use of petroleum products pose health and environmental problems. As a result, increasing environmental regulations have been enacted mandating lower levels of sulfur in transportation and other fuel products. The reduced-sulfur specifications applicable to these fuel products have impacted the refining industry. For instance, European regulations have required a change in the content of sulfur from 5000 ppm in low sulfur diesel to less than 10 ppm in ultra-low sulfur diesel or ULDS.

Hydroprocessing involves the treatment of hydrocarbons with hydrogen in the presence of catalysts, and is a conventional method for heteroatom (e.g., sulfur and nitrogen) removal. Many existing hydroprocessing facilities, such as those using relatively low pressure hydrotreaters, were constructed before these more stringent sulfur reduction requirements were enacted and represent a substantial prior investment. Accordingly, any upgrading of these existing hydrotreating reactors would be difficult. As hydrotreaters, especially in Europe, are constrained to operate at low hydrogen partial pressure and have limited hydrogen availability, refineries have to use large amounts of catalysts to lower the sulfur content and meet regulations or downstream process. As such, refineries are often operating at the top of their capacity, temperature- and pressure-wise.

Additionally, these refineries are processing feeds containing hindered sulfur and nitrogen within multi-ring aromatics. For these feeds, processes such as hydrodesulfurization (HDS) or hydrodenitrogenation (HDN) may be used where hydrogenation is followed by hydrogenolysis before sulfur or nitrogen removal. However, these processes require high pressures, whereas the direct sulfur removal mechanism (direct desulfurization or DDS) is a single step reaction in which sulfur is converted via C—S bond cleavage without ring saturation to H2S. This mechanism is not as sensitive to hydrogen partial pressure and may be used at lower pressures, but is prone to H2S poisoning of the catalyst. Thus, these units are limited in the amount of and quality of feed that can be processed.

As refineries are being forced to process crudes with larger amounts of sulfur and nitrogen and environmental regulations are mandating lower levels of these heteroatoms in products, a need exists to find catalysts which will allow more efficient desulfurization and/or denitrogenation, particularly when existing hydroprocessing units are limited in their pressure capability and their process conditions.

SUMMARY

This application relates to tungsten-containing bulk catalyst compositions, methods of making these bulk catalyst compositions, and use of these bulk catalyst compositions for hydroprocessing of hydrocarbon feed stocks, which can include hydrodesulfurization and/or hydrodenitrogenation.

In an aspect, embodiments of the present disclosure are directed to compositions that include compounds having a formula: $Co_yW_{1-x}M_xO_4$ (I), wherein M is Mo, V, or Nb; $0.5 \geq x \geq 0$; and $1 \leq y \leq 4$; and wherein the compound has an X-ray powder diffraction pattern including characteristic diffraction peaks having d-spacing values of about 2.90 Å, 2.56 Å, and 1.73 Å.

In another aspect, embodiments of the present disclosure are directed to methods of making a bulk catalyst composition including (i) combining tungstic acid and cobalt carbonate and (ii) reacting the tungstic acid and cobalt carbonate to form a catalyst composition, wherein the cobalt carbonate has an X-ray powder diffraction pattern including characteristic diffraction peaks having d-spacing values of about 10.03 Å, 5.91 Å, 4.35 Å, and 4.21 Å.

In another aspect, embodiments of the present disclosure are directed to methods including (i) contacting a feed with hydrogen in the presence of a catalyst composition comprising a compound having a formula $Co_yW_{1-x}M_xO_4$ (I), wherein M is Mo, V, or Nb; $0.5 \geq x \geq 0$; and $1 \leq y \leq 4$; and (ii) forming a hydrocarbon product, wherein the compound has an X-ray powder diffraction pattern comprising characteristic diffraction peaks having d-spacing values of about 2.90 Å, 2.56 Å, and 1.73 Å.

BRIEF DESCRIPTION OF THE DRAWINGS

The following figures are included to illustrate certain aspects of the present disclosure, and should not be viewed as exclusive configurations. The subject matter disclosed is capable of considerable modifications, alterations, combinations, and equivalents in form and function, as will occur to one of ordinary skill in the art and having the benefit of this disclosure.

DETAILED DESCRIPTION

Figure 1:
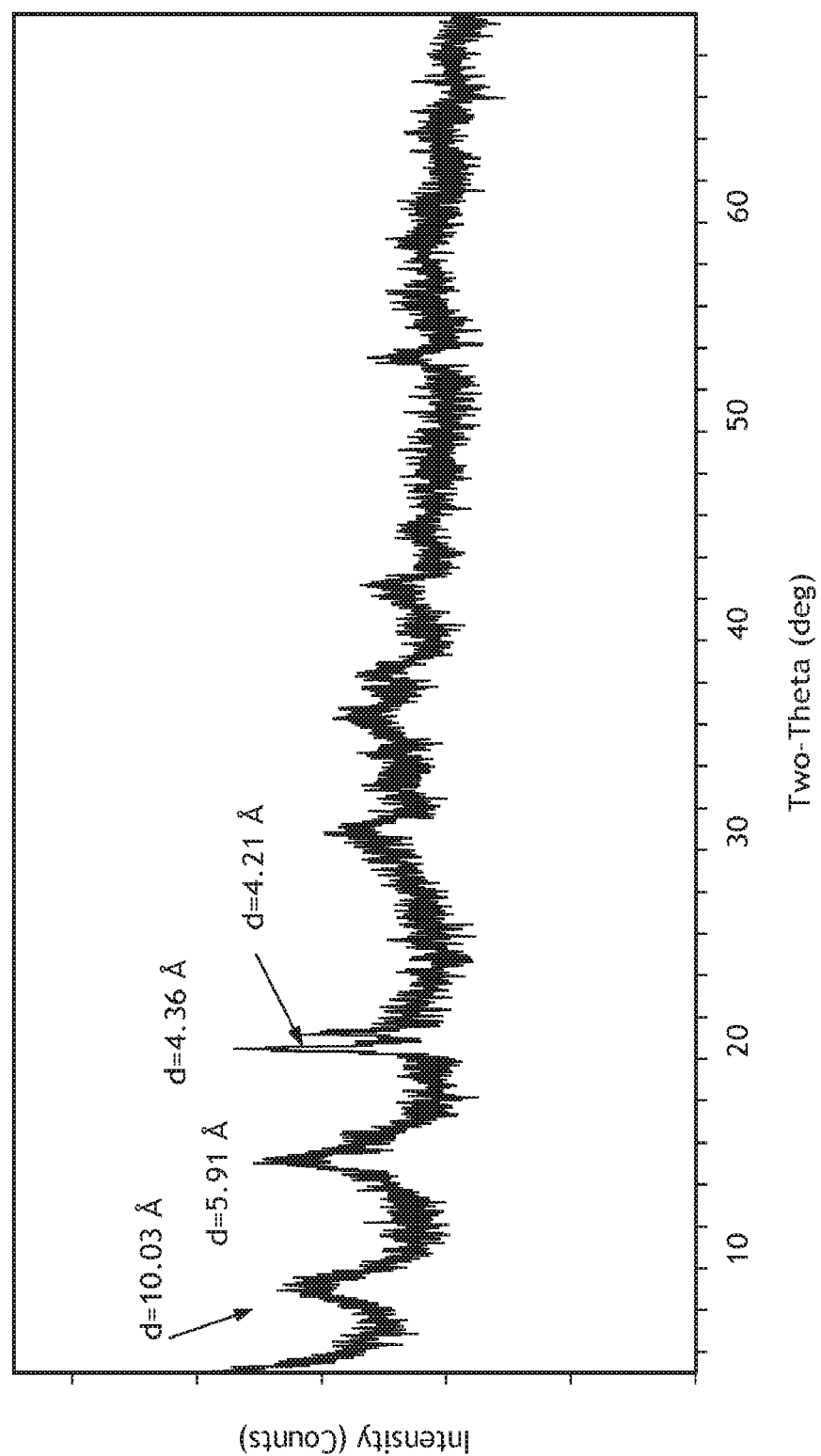
FIG. 1 shows the X-ray diffraction patterns for a cobalt carbonate reagent in accordance with embodiments of the present disclosure.

This application relates to tungsten-containing bulk catalyst compositions, methods of making these bulk catalyst compositions, and use of these bulk catalyst compositions for hydroprocessing of hydrocarbon feed stocks, which can include hydrodesulfurization and/or hydrodenitrogenation.

Definitions

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A", and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides).

As used here, the term "bulk catalyst composition" includes catalyst compositions formed through precipitation and/or solid-solid reactions. In some embodiments, the bulk catalyst composition can be free of binder additives ("unsupported"), or composited with a binder to aid formulation of the materials into particles, such as for fixed bed applications. Bulk catalyst compositions disclosed herein can also include dispersing-type catalyst ("slurry catalyst") for use as dispersed catalyst particles in mixture of liquid (e.g., hydrocarbon oil), which similarly can be formulated with or without a binder.

Binders for bulk catalyst compositions include any suitable binder for hydroprocessing applications, such as silica, silica-alumina, alumina such as (pseudo)boehmite, gibbsite, titania, zirconia, cationic clays or anionic clays such as saponite, bentonite, kaoline, sepiolite or hydrotalcite, or mixtures thereof. Preferred binders are silica, silica-alumina, alumina, titania, zirconia, or mixtures thereof. Binders can also include binder precursors such as alkali metal aluminates (to obtain an alumina binder), water glass (to obtain a silica binder), a mixture of alkali metal aluminates and water glass (to obtain a silica alumina binder), a mixture of sources of a di-, tri-, and/or tetravalent metal such as a mixture of water-soluble salts of magnesium, aluminum and/or silicon (to prepare a cationic clay and/or anionic clay), chlorohydrol, aluminum sulfate, or mixtures thereof. Binders can be added to a bulk catalyst composition in amounts from 0-95 wt. % of the total composition, depending on the envisaged catalytic application.

The terms "treatment," "treated," "upgrade", "upgrading" and "upgraded", when used in conjunction with a heavy oil feedstock, describes a heavy oil feedstock that is being or has been subjected to hydroprocessing, or a resulting material or crude product, having a reduction in the molecular weight of the heavy oil feedstock, a reduction in the boiling point range of the heavy oil feedstock, a reduction in the concentration of asphaltenes, a reduction in the concentration of hydrocarbon free radicals, and/or a reduction in the quantity of impurities, such as sulfur, nitrogen, oxygen, halides, and metals.

The upgrade or treatment of heavy oil feeds is generally referred herein as "hydroprocessing" (or hydroconversion). Hydroprocessing is meant as any process that is carried out in the presence of hydrogen, including, but not limited to, hydroconversion, hydrocracking, hydrogenation, hydrotreating, hydrodesulfurization, hydrodenitrogenation, hydrodemetallation, hydrodearomatization, hydroisomerization, hydrodewaxing and hydrocracking including selective hydrocracking. The products of hydroprocessing may show improved viscosities, viscosity indices, saturates content, low temperature properties, volatilities and depolarization, etc.

As used herein, the term "catalyst precursor" refers to a compound containing one or more catalytically active metals, from which compound the catalyst of the invention having the formula $Co_yW_{1-x}MxO_4$ (I), wherein M is Mo, V, or Nb; $0.5 \geq x \geq 0$; and y is 1, 2, 3, or 4, is eventually formed, and which compound may be catalytically active as a hydroprocessing catalyst.

As used herein, the phrase "one or more of" or "at least one of" when used to preface several elements or classes of elements such as X, Y and Z or X1-Xn, Y1-Yn and Z1-Zn, is intended to refer to a single element selected from X or Y or Z, a combination of elements selected from the same common class (such as X1 and X2), as well as a combination of elements selected from different classes (such as X1, Y2 and Zn).

SCF/B (or scf/b) refers to a unit of standard cubic foot of gas (N2, H2, etc.) per barrel of hydrocarbon feed.

The term "hydrothermal conditions" is meant to imply reaction conditions wherein the reaction temperature is above the boiling temperature of the protic liquid. Hydrothermal conditions can give rise to a pressure above atmospheric pressure and, in some embodiments, the reaction can be performed in an autoclave, which can be pressured by autogenic pressure (without applying additional pressure). An autoclave is a device capable of withstanding pressure designed to heat liquids above their boiling temperature.

Bulk Catalyst Compositions

An aspect of the application is to provide a bulk catalyst composition having a higher catalytic activity. A further object of the application is to provide bulk catalyst compositions having a high catalytic activity at reduced pressures, including increased activity during hydroprocessing applications.

According to the application, bulk catalyst compositions can include metal oxide particles having a formula $Co_yW_{1-x}MxO_4$ (I), wherein M is Mo, V, or Nb; $0.5 \geq x \geq 0$; $1 \leq y \leq 4$. While not limited by any particular theory, the presence of the metastable hexagonal phase is correlated with a high catalytic activity of the bulk catalyst composition, and the bulk catalyst compositions and reagents/precursors disclosed herein can be described according to X-ray diffraction (XRD) features relating to the presence of a metastable hexagonal phase. In some embodiments, the metal oxide particles of formula $Co_yW_{1-x}MxO_4$ can include a hexagonal crystalline phase characterized by an X-ray powder diffraction pattern comprising characteristic diffraction peaks having d-spacing values of about 2.90 Å, 2.56 Å and 1.73 Å.

Another aspect of the application are methods of preparing bulk catalyst compositions that can include the steps of (i) combining tungstic acid and cobalt carbonate and (ii) reacting the tungstic acid and cobalt carbonate to form a catalyst composition. Characteristic XRD features of the starting materials have been linked to the formation of hexagonal crystal structures in the final bulk catalyst composition that are correlated to higher catalytic activity. For example, the cobalt carbonate reagents disclosed herein and used to react with tungstic acid can have an X-ray powder diffraction pattern including characteristic diffraction peaks having d-spacing values of about 10.03 Å, 5.91 Å, 4.35 Å and 4.21 Å.

In some embodiments, methods include hydroprocessing a hydrocarbon feed by a process including contacting the feed with hydrogen in the presence of a catalytically effective amount of a bulk catalyst composition under catalyst conversion conditions. The bulk catalyst compositions can include a compound of formula $Co_yW_{1-x}MxO_4$ (I), wherein M is Mo, V, or Nb; $0.5 \geq x \geq 0$; and y is $1 \leq y \leq 4$. In an aspect, bulk catalyst compositions can be non-amorphous, i.e., the catalyst exhibits at least some crystallinity as evidenced by X-ray diffraction, for example.

Bulk catalyst compositions disclosed herein can be effective for the removal of nitrogen and sulfur from a hydrocarbon feed, and for hydroprocessing feeds containing both nitrogen and sulfur. The contacting of the hydrocarbonaceous feedstream with the bulk metal hydroprocessing catalyst occurs in the presence of a hydrogen-containing treat gas, and the reaction stage is operated under effective hydroprocessing conditions. The contacting of the hydrocarbonaceous feedstream with the bulk catalyst composition can produce at least a liquid hydrocarbon product having less nitrogen, sulfur, or both compared to the initial feed.

In some embodiments, bulk catalyst compositions can have a high hydrodesulfurization and hydrodenitrogenation activity, and is able to reach very low levels of residual sulfur in the product. It was surprisingly found that bulk catalyst compositions can exhibit high hydrodesulfurization activity under a variety of conditions, including at low pressures. While not bound by any particular theory, the removal of sulfur may prevent catalyst poisoning and a corresponding reduction in denitrogenation activity, which results in low product nitrogen and low product sulfur.

When employed in hydroprocessing applications, bulk catalyst compositions disclosed herein can include non-amorphous, bulk multimetallic catalysts having high catalytic activity and distinct crystallographic features. In an aspect, the bulk catalyst compositions can include a hexagonal structure having an X-ray diffraction pattern showing at least three characteristic diffraction peaks having d-spacing values of about 2.90 Å, 2.56 Å, and 1.73 Å. In some embodiments, the presence of the hexagonal phase is associated with high catalytic activity.

In another aspect, the bulk catalyst compositions can include a chelant containing at least 10 carbon atoms, or at least 15 carbon atoms, or at least 20 carbon atoms, or at least 25 carbon atoms, or at least 30 carbon atoms, or at least 35 carbon atoms.

Examples of organic compounds are compounds containing amine groups, which include, but are not limited to, primary and/or secondary, linear, branched alkylamines, and/or cyclic amines, such as stearylamine, triacontanylamine, octacosanylamine, hexacosanylamine, tetracosanylamine, docosanylamine, erucylamine, eicosanylamine, octadecylamine, oleylamine, linoleylamine, hexadecylamine, sapienylamine, palmitoleylamine, tetradecylamine, myristoleylamine, dodecylamine, decylamine, diaminoeicosane, diaminooctadecane, diaminohexadecane, diaminotetradecane, diaminododecane, diaminodecane, and the like, and combinations thereof. In some embodiments, the molar ratio of the W and/or Mo in the catalyst composition to the chelant can be from about 1:1 to about 20:1.

In some embodiments, the amine portion of the first organic compound can be a part of a larger functional group in that compound, so long as the amine portion (notably the amine nitrogen and the constituents attached thereto) retains the capability of participating in forming an amide or other condensation reaction product with one or more of the functional groups from a second organic compound. For example, a urea functional group could be considered an "amine-containing" functional group, where the functional group contains an amine portion attached to the carbonyl portion of an amide group capable of reacting in a condensation reaction with the carboxylic acid functional group of a second organic compound. Other examples of such amine-containing functional groups include, but are not limited to, hydrazides, sulfonamides, and the like, and combinations thereof.

Examples of organic compounds containing amine groups also include, but are not limited to, primary and/or secondary, linear, branched alkylamides, and/or cyclic amides, such as any amide having at least 10 carbons, including dodecanamide, lauramide, decanamide, undecanamide, hexacosanamide, tetracos anamide, docosanamide, octadecanamide, hexadecanamide, dodecanamide, decanamide, C10+ amide, such as C36 amide, and the like, and combinations thereof. In some embodiments, the molar ratio of the W and/or Mo to the chelant in the bulk catalyst composition can be from about 1:1 to about 20:1.

In another aspect, bulk catalyst compositions can include compositions that have been sulfided with a suitable sulfur-containing compound such as elemental sulfur. The bulk catalyst composition or sulfided bulk catalyst composition can be used for the hydrotreatment of a hydrocarbon feedstock.

Preparation of Bulk Catalyst Compositions

Methods of preparing bulk catalyst compositions disclosed herein can include (i) combining tungstic acid and cobalt carbonate and (ii) reacting the tungstic acid and cobalt carbonate under hydrothermal conditions to form the bulk catalyst composition. During the hydrothermal reaction, the reagents undergo partial melting/dissolution and react with at the surface of the cobalt carbonate forming a bulk catalyst. By selecting a cobalt carbonate starting material having characteristic diffraction peaks that have been linked to the formation of hexagonal crystal structures in the final bulk catalyst composition, methods disclosed herein generate bulk catalyst compositions having higher catalytic activity. In some embodiments, the cobalt carbonate reactant used to prepare bulk catalyst compositions can include an X-ray powder diffraction pattern having characteristic diffraction peaks having d-spacing values of about 10.03 Å, 5.91 Å, 4.35 Å and 4.21 Å. The bulk catalyst compositions disclosed herein can be prepared under hydrothermal conditions by forming a slurry, such as an aqueous slurry, that includes an insoluble oxide or acid form of tungsten, such as tungstic acid; cobalt carbonate; and optionally (a) a salt or oxyanion of a Group 5 or Group 6 metal, such as a molybdate, vanadate and/or a niobate, or (b) insoluble (oxide, acid) form of a Group 5 or Group 6 metal, such as molybdenum trioxide, niobic acid and/or diniobium pentoxide.

Hydrothermal conditions used to prepare the bulk catalyst compositions can include temperatures in a range of about 150° C. to about 250° C., such as from about 50° C. to about 180° C., about 55° C. to about 170° C., or about 60° C. to about 150° C. Pressures during hydrothermal reactions can also range from atmospheric pressures or greater, including autogenous pressures generated during the reaction. Time periods for hydrothermal reactions can include times that range from about 15 minutes to about 5 days or more, from about 1 hour to about 5 days, or about 4 hours to about 24 hours.

Bulk catalyst compositions disclosed here can have a median particle diameter of at least 50 nm, 100 nm, or 150 nm, up to a median particle diameter of about 1 mm, 3 mm, or 5 mm. In some embodiments, bulk catalyst compositions can have a median particle diameter of about 100 nm to about 1 mm, or about 500 nm to about 500 µm.

Bulk catalyst compositions disclosed herein can exhibit a specific surface area (as measured by the nitrogen BET method using a Quantachrome Autosorb™ apparatus) ASTM D3663-03(2015) of at least about 20 m2/g, at least about 30 m2/g, at least about 40 m2/g, at least about 50 m2/g, at least about 60 m2/g, at least about 70 m2/g, or at least about 80 m2/g. In some embodiments, the bulk catalyst compositions can exhibit a specific surface area of not more than about 500 m2/g, for example not more than about 400 m2/g, not more than about 300 m2/g, not more than about 250 m2/g, not more than about 200 m2/g, not more than about 175 m2/g, not more than about 150 m2/g, not more than about 125 m2/g, or not more than about 100 m2/g. In some embodiments, the bulk catalyst compositions can exhibit a specific surface area that ranges from about 20 m2/g to about 500 m2/g, about 30 m2/g to about 400 m2/g, or about 40 m2/g to about 250 m2/g.

After separating and drying, the bulk catalyst composition can be treated (e.g., by impregnation or other contact method) with an effective amount of a chelant containing at least one amine group or an amide group. In the bulk catalyst compositions described herein, the chelant can contain at least 10 carbon atoms, at least 15 carbon atoms, for example at least 20 carbon atoms, at least 25 carbon atoms, at least 30 carbon atoms, or at least 35 carbon atoms. In some embodiments, the chelant can have a carbon number within a range of from 10 to 40 carbon atoms, 10 to 50 carbon atoms, or 10 to 60 carbon atoms.

The bulk catalyst compositions containing a chelant can be prepared by combining a catalyst having a formula $Co_yW_{1-x}M_xO_4$ (I), wherein M is Mo, V, or Nb; $0.5 \geq x \geq 0$; and $1 \leq y \leq 4$, with a chelant containing at least one amine group or one amide group, and heating to at least at least 80° C., at least 90° C., or at least 100° C. During the heating process, the components are continuously mixed together and the resulting product is heated in a box furnace to high temperatures in a range of about 150° C. to about 250° C., such as at least 170° C., 190° C., 200° C., 225° C., or 250° C. In some embodiments, gradient heating can be used, including heating at a suitable rate such as 1° C./minute, 1.5° C./minute, or 2° C./minute. The duration of heating can be at least 2 hours, at least 3 hours, or at least 4 hours, followed by a direct or staged cooling process.

However, process conditions and times can be modified depending on the application. It is contemplated that the specific lower and upper temperature limits based on the above considerations can be highly dependent upon a variety of factors that can include, but are not limited to, the atmospheric pressure and composition under which the heating is conducted, the chemical and/or physical properties of the chelant, and/or any reaction byproduct, or a combination thereof.

Compositions disclosed herein also include sulfided bulk catalyst compositions prepared by contacting a bulk catalyst composition with a sulfur-containing compound at a temperature and for a time sufficient to substantially sulfide the composition and/or sufficient to render the sulfided composition active as a hydroprocessing catalyst. Methods disclosed herein also relate to the use of sulfided bulk catalyst compositions for the hydrotreatment of a hydrocarbon feedstock. Sulfur-containing compounds can include elemental sulfur, hydrogen sulfide, polysulfides, or the like, or a combination thereof, which may originate from a fossil/mineral oil stream, from a biocomponent-based oil stream, from a combination thereof, or from a sulfur-containing stream separate from the aforementioned oil stream(s).

Sulfiding processes for treating bulk catalyst compositions disclosed herein can be carried out at a temperature that ranges from about 300° C. to about 400° C., about 310° C. to about 350° C., or about 315° C. to about 345° C. In some embodiments, sulfiding processes can be conducted for a period of time ranging from about 30 minutes to about 96 hours, from about 1 hour to about 48 hours, or from about 4 hours to about 24 hours.

Catalytic Hydroprocessing

Bulk catalyst compositions disclosed herein can be useful in processes for the hydrodesulfurization and hydrodenitrogenation of feed streams high in sulfur content in a hydrotreating system, including systems requiring low pressures. Hydrocarbon feed streams can include streams obtained or derived from crude petroleum oil, tar sands, coal liquefaction, shale oil, and hydrocarbon synthesis. Hydrocarbon feeds also include feeds boiling from the naphtha boiling range to heavy feedstocks, such as gas oils and resids, and feeds derived from Fischer-Tropsch processes. In some embodiments, hydrocarbon feed streams include streams having a boiling range from about 40° C. to about 1000° C. Non-limiting examples of suitable feedstreams include vacuum gas oils; distillates including naphtha, diesel, kerosene, and jet fuel; heavy gas oils, raffinates, lube oils, cycle oils, waxy oils, and the like.

In some cases, hydrocarbon feeds can contain contaminants such as nitrogen and sulfur. Feed nitrogen content based on the weight of the feed can range from about 50 wppm to about 5000 wppm, about 75 wppm to about 800 wppm, or about 100 wppm to about 700 wppm. Nitrogen-based contaminants can appear both as basic and non-basic nitrogen species, and can be free or in an organically-bound form. Examples of basic nitrogen species include quinolines and substituted quinolines, and examples of non-basic nitrogen species may include carbazoles and substituted carbazoles.

Feed sulfur content based on the weight of the feed can range from about 50 wppm to about 5 wppm, from about 100 wppm to about 5000 wppm, or from about 100 wppm to about 3000 wppm. Feeds subjected to prior processing, such as separation, extraction, hydroprocessing, and the like, may have less sulfur, for example in the range of 75 wppm to 500 wppm.

Feed sulfur can include free or organically-bound sulfur. Organically-bound sulfur can include simple aliphatic, naphthenic, and aromatic mercaptans, sulfides, di- and polysulfides, and heterocyclic sulfur compounds, such as thiophene, tetrahydrothiophene, benzothiophene and their higher homologs and analogs. The feed can also contain olefinic and aromatic hydrocarbon, with aromatic hydrocarbons being present in an amount based on the weight of the feed ranging from about 0.05 wt % to about 50 wt %.

Methods disclosed herein include hydroprocessing a feed by contacting the feed with hydrogen in the presence of the bulk catalyst composition under catalytic hydroprocessing conditions. The term "hydroprocessing" means a catalytic process conducted in the presence of hydrogen, which may be in the form of a hydrogen-containing treat gas. Hydroprocessing processes can include the treatment of various feed streams, such as the hydroconversion of heavy petroleum feedstocks to lower boiling products; the hydrocracking of distillate boiling range feedstocks; the hydrotreating of various petroleum feedstocks to remove heteroatoms, such as sulfur, nitrogen, and oxygen; the hydrogenation of unsaturated hydrocarbon; the hydroisomerization and/or catalytic dewaxing of waxes, such as Fischer-Tropsch waxes; demetallation of heavy hydrocarbons; and ring-opening reactions. "Effective hydroprocessing conditions" can be considered those conditions that achieve the desired result of the hydroprocessing process. For example, effective hydroisomerization and/or catalytic dewaxing conditions are to be considered those conditions that achieve the desired degree of dewaxing to produce the desired product.

Hydroprocessing conditions also include conditions effective for hydrotreating feed streams in some embodiments. Hydrotreating reactions can include, e.g., (i) hydrogenation and/or (ii) hydrogenolysis. Generally, hydrotreating conditions will result in removing at least a portion of the heteroatoms in the feed and hydrogenating at least a portion of the aromatics in the feed.

Methods of hydroprocessing disclosed herein can be performed at temperatures within a range of about 100° C. to about 450° C., about 200° C. to about 370° C., or about 230° C. to about 350° C. Methods of hydroprocessing can be conducted at weight hourly space velocities ("WHSV") that range from about 0.05 to about 20 hr-1, or about 0.5 to about 5 hr-1. Hydrotreating methods can be performed at any effective pressure, which can include pressures ranging from about 5 to about 250 bar.

Methods of hydroprocessing can utilize hydrogen or a hydrogen-containing treat gas. Treat gas can contain substantially pure hydrogen or can be mixtures of other components typically found in refinery hydrogen streams. In some embodiments, treat gas contains substantially no sulfur-based compounds such as hydrogen sulfide. In some embodiments, treat gas can include at least about 50% by volume hydrogen, at least about 75% by volume hydrogen, or at least about 90% by volume hydrogen. In some embodiments, the hydrogen (H2) to oil ratio can range from about 5 NL/L to about 2000 NL/L. Process conditions may vary, as is known to those skilled in the art, depending on the feed boiling range and speciation. For example, as the boiling point of the feed increases, the severity of the conditions will also increase.

In some embodiments, hydroprocessing reactions occur in a reaction stage that incorporates at least one bulk catalyst composition. The reaction stage can include one or more reactors, or reaction zones that include one or more catalyst beds of the same or different catalyst. Any suitable catalyst bed/reactor can be used, including fixed beds, fluidized beds, ebullating beds, slurry beds, and moving beds. Interstage cooling or heating between reactors, reaction zones, or between catalyst beds in the same reactor, can be employed. A portion of the heat generated during hydroprocessing can be recovered in some embodiments, or conventional cooling to maintain temperature may be performed through cooling utilities such as cooling water or air, or a hydrogen quench stream.

To facilitate a better understanding of the embodiments described herein, the following examples of various representative embodiments are given. In no way should the following examples be read to limit, or to define, the scope of the present disclosure.

EXAMPLES

Standard procedures or customized procedures were followed for bulk catalyst composition preparation, loading, sulfiding, and activity testing. The liquid products were analyzed for nitrogen and sulfur content as low as the <10 ppm wt range using a chemiluminescence analyzer after proper stripping to remove traces of H2S. Catalytic desulfurization activity of the sample catalyst was tested by comparison to a fresh reference catalyst under the same conditions. The test results are reported as Relative Volume Activity (RVA) required to reduce the sulfur level in the liquid product with a constant volume of catalyst tested.

Preparation of Test Samples

Example E1—CoWO$_x$ Hexagonal Phase

Hexagonal phase CoWO$_x$ was prepared by adding 10.020 g CoCO$_3$ and 21.050 g H$_2$WO$_4$ to 500 mL water. The X-ray diffraction (XRD) spectra for the CoCO$_3$ starting material exhibiting d-spacing values of about 10.03 Å, 5.91 Å, 4.35 Å, and 4.21 Å is shown in FIG. 1.

The mixture was heated at 100° C. with stirring for 5 days. The product was filtered and spread in a thin layer and dried at 100° C. overnight. A purple powder was obtained as the solid product, and the filtrate was light blue. The final elemental analysis on solid powder indicated a Co to W ratio as Co$_1$W$_{0.95}$, and the BET surface area was calculated as 113.9 m2/g using the nitrogen BET method using a Quantachrome Autosorb™ apparatus.

Figure 2:
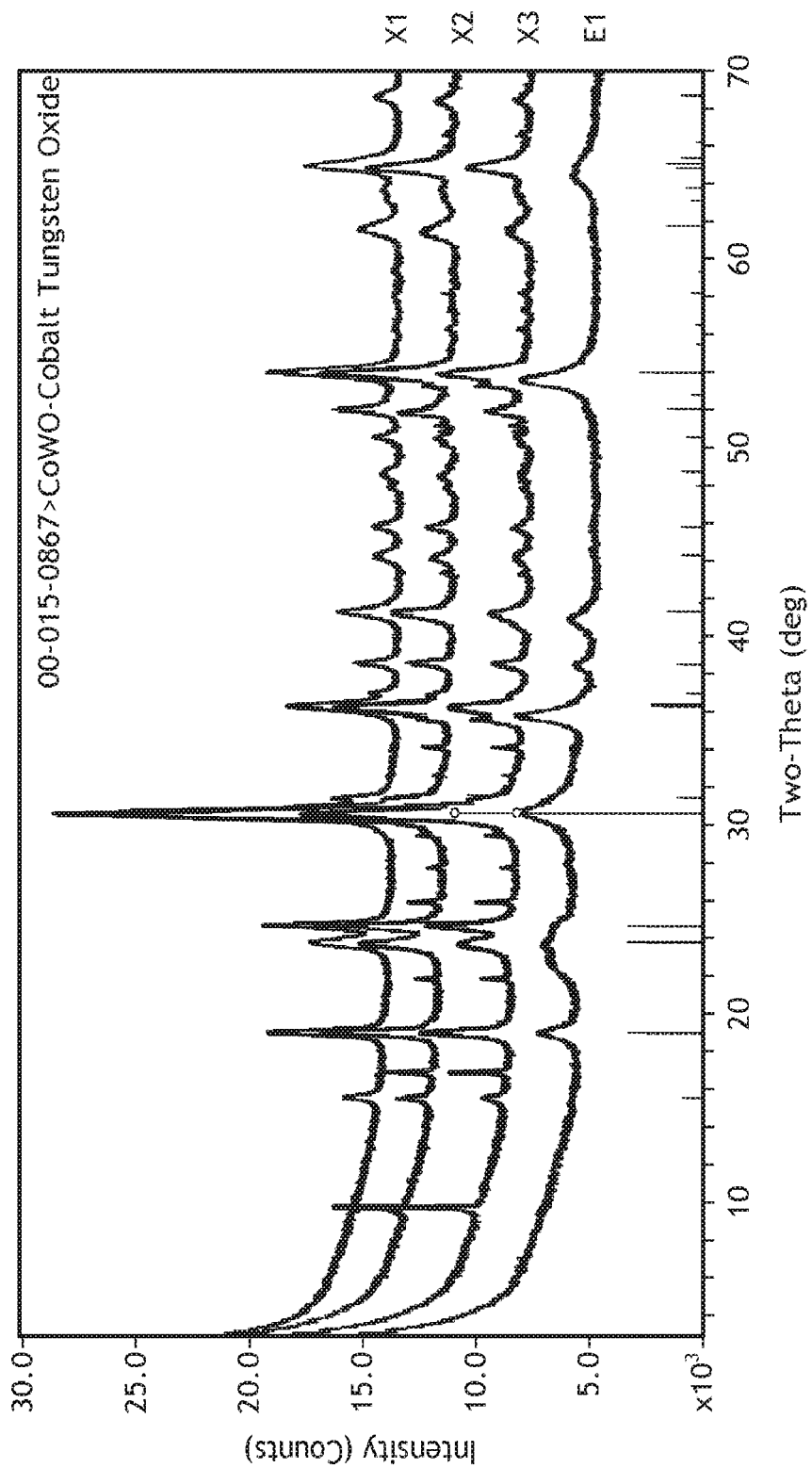
FIG. 2 shows the X-ray diffraction patterns for a number of $CoWO_x$ products prepared using various cobalt carbonate starting materials that may incorporate one or more principles of the present disclosure.

By utilizing the CoCO$_3$ starting material described above, products obtained exhibit primarily hexagonal phase character while limiting the amount of phases that can be less active or interfere with the activity of the hexagonal phase. For example, FIG. 2 is a comparison of XRD spectra for E1, a CoWO$_x$ product prepared using a starting material having d-spacing values similar to FIG. 1, with samples X1-X3 prepared with cobalt carbonate lacking d-spacing values of about 10.03 Å, 5.91 Å, 4.35 Å, and 4.21 Å. CoWO$_x$ products X1-X3 clearly indicate the presence of additional and less active phases.

Example E2—CoWO$_x$ With C36 Amide

CoWO$_x$ with C36 amide chelant prepared by comelting oleylamine and oleic acid at a 1:1 molar ratio to 25.00 g of the CoWO$_x$ powder of Example 1 at 100° C. until incipient wetness was reached. During the course of addition, the combination was mixed well with a spatula to ensure thorough dispersion of the amide. Incipient wetness was achieved after adding 4.19 g of C36 amide, to give a weight ratio of 0.17 g amide to 1 g CoWO$_x$. The resulting product was heated in air to 225° C. at a rate of 1.5° C./minute, and held at that temperature for 4 hours.

Example E3—CoWO$_x$ With Stearylamine

CoWO$_x$ with stearylamine was prepared by dissolving 1.052 g stearylamine in 2 mL heptane at 100° C., which was then added in two parts to 7.010 g CoWO$_x$ powder of Example 1 at 100° C. During the course of addition, the wetted powder was mixed well with a spatula to ensure thorough dispersion of the liquid. The product appeared to be near the incipient wetness point once all of the liquid was added, and the final weight ratio was 0.15 g stearylamine to 1 g CoWO$_x$. The resulting product was heated in air to 225° C. at a rate of 1.5° C./minute, and held at that temperature for 4 hours.

Example E4—CoWO$_x$ With 1:3 Stearylamine:Sulfur

CoWO$_x$ with stearylamine and sulfur was prepared by heating 2.474 g stearylamine and 0.883 g elemental sulfur (molar ratio of 1 to 3, respectively) to 130° C. with stirring for 15 minutes, until all sulfur was reacted and the solution was a uniform black liquid. 2.765 g of the stearylamine/sulfur mixture was then added to 17.0 g of CoWO$_x$ powder of Example 1 at 100° C. The wetted powder was mixed well with a spatula to ensure thorough dispersion of the liquid. The product appeared to be near the incipient wetness point once all of the liquid was added, and the final weight ratio was 0.16 g of 1:3 stearylamine:S to 1 g CoWO$_x$. The resulting product was heated in air to 225° C. at a rate of 1.5° C./minute, and held at that temperature for 4 hours.

Example E5—Co1.2Mo0.5W0.5Ox Hexagonal Phase

Hexagonal phase Co1.2Mo0.5W0.5Ox was prepared by adding 12.0 g CoCO$_3$, 6.060 g MoO$_3$, and 10.530 g H$_2$WO$_4$ to 500 mL water. The mixture was heated at 100° C. with stirring for 5 days. The resulting product was filtered and spread in a thin layer to dry at 100° C. overnight. A brown powder was obtained as solid product, the filtrate was light brown. The final elemental analysis on the solid powder indicated a Co to Mo to W ratio as Co1.2Mo0.60W0.69, the BET surface area was 113.7 m2/g.

Example E6—Co$_{1.2}$Mo$_{0.5}$W$_{0.5}$O$_x$ With Stearylamine

Co$_{1.2}$Mo$_{0.5}$W$_{0.5}$O$_x$ with stearylamine was prepared by mixing together 1.059 g stearylamine and 7.061 g Co$_{1.2}$Mo$_{0.5}$W$_{0.5}$O$_x$, then heating to 100° C. During the heating process, the powders were continuously mixed together well with a spatula to ensure thorough dispersion of the stearylamine. The product appeared to be near the incipient wetness point once all of the stearylamine was impregnated, and the final weight ratio was 0.15 g stearylamine to 1 g Co$_{1.2}$Mo$_{0.5}$W$_{0.5}$O$_x$. The resulting product was heated in air at a temperature in the range of 150° C. to 250° C.

Example E7—Co$_{1.2}$Mo$_{0.5}$W$_{0.5}$O$_x$ With 1:3 Stearylamine:Sulfur

Co$_{1.2}$Mo$_{0.5}$W$_{0.5}$O$_x$ with stearylamine and sulfur was prepared by heating 1.7 g stearylamine and 0.607 g elemental sulfur (molar ratio of 1 to 3, respectively) to 130° C. with stirring for 15 minutes, until all sulfur is reacted and the solution was a uniform black liquid. 17 g of the stearylamine/sulfur mixture was then added to 10.0 g of Co$_{1.2}$Mo$_{0.5}$W$_{0.5}$OP$_x$ powder at 100° C. The wetted powder was mixed well with a spatula to ensure thorough dispersion of the liquid. The product appeared to be near the incipient wetness point once all of the liquid was added, and the final weight ratio was 0.17 g of 1:3 stearylamine:S to 1 g Co$_{1.2}$Mo$_{0.5}$W$_{0.5}$O$_x$. The resulting product was heated in air at a temperature in the range of 150° C. to 250° C.

Example E8—Co$_{1.2}$Mo$_{0.5}$W$_{0.5}$O$_x$ Hexagonal Phase

Hexagonal phase Co$_{1.2}$Mo$_{0.5}$W$_{0.5}$O$_x$ was prepared by adding 8.0 g CoCO$_3$, 2.580 g V$_2$O$_5$, and 7.070 g H$_2$WO$_4$ to 500 mL water. NH$_4$OH was used to adjust solution pH to 9.0, then heat at 100° C. with stirring for 4 days. The product was filtered and spread in a thin layer to dry at 100° C. overnight. A brown powder was obtained as solid product, the filtrate was yellow. The final elemental analysis on the solid powder indicated a Co to V to W ratio as $Co_{1.2}V_{0.40}W_{0.51}$, the BET surface area was 104.6 m2/g.

Example E9—$CoNb_{0.5}W_{0.5}O_x$ Hexagonal Phase

Hexagonal phase $CoNb_{0.5}W_{0.5}W_{0.5}O_x$ was prepared by adding 0.667 g $CoCO_3$, 0.448 g $Nb_2O_5$, and 0.707 g $H_2WO_4$ to 67 mL water. $NH_4OH$ was used to adjust solution pH to 10, then heat at 150° C. with stirring for 6 hours. The product was filtered and spread in a thin layer to dry at 100° C. overnight. 1.167 g purplish brown powder was obtained as solid product, the filtrate was red. The final elemental analysis on the solid powder indicated Co to Nb to W ratio as $Co_{1.2}Nb_{0.19}W_{0.55}$, the BET surface area was 37.4 m2/g.

Example E10—$Co_2WO_x$ Hexagonal Phase

Hexagonal phase $Co2WO_x$ was prepared by adding 7.515 g Alfa Chemical 99.0% grade $CoCO_3$ and 7.894 g Sigma Aldrich $H_2WO_4$ to 120 mL water. The mixture was heated at 100° C. with stirring for 30 minutes. The product was filtered and spread in a thin layer to dry at 100° C. overnight. 12.371 g greyish purple powder was obtained as solid product, the filtrate was colorless. The final elemental analysis on the solid powder indicated a Co to W ratio as Co1.6W1, the BET surface area was 86.0 m2/g.

Example E11—$Co_2Mo_{0.5}W_{0.5}O_x$ New Phase 4

New phase #4 $Co_2Mo_{0.5}W_{0.5}O_x$ was prepared by adding 7.515 g Alfa Chemical 99.0% grade $CoCO_3$, 2.269 g Sigma Aldrich $MoO_3$, and 3.947 g Sigma Aldrich $H_2WO_4$ to 120 mL water. The mixture was heated at 100° C. with stirring for 15 minutes, then the solution was cooled rapidly to 20° C. using an ice bath. The product was filtered and spread in a thin layer to dry at 100° C. overnight. 10.733 g of brown powder was obtained as solid product, the filtrate was light pink. The final elemental analysis on the solid powder indicated a Co to Mo to W ratio as $Co_2Mo_{0.45}W_{0.45}$, the BET surface area was 131.7 m²/g.

Example E12—$Co_2Mo_{0.5}W_{0.5}O_x$ New Phase 3

New phase #3 $Co_2Mo_{0.5}W_{0.5}O_x$ was prepared by adding 10.020 g Alfa Chemical's 99.0% grade $CoCO_3$ and 5.041 g Sigma Aldrich $MoO_3$ and 10.52 g Sigma Aldrich $H_2WO_4$ to 170 mL water. The mixture was heated to 75° C. for 4 hours. The product was filtered and spread in a thin layer to dry at 100° C. overnight. The final elemental analysis on solid powder indicated a Co to Mo to W ratio as $Co_2M_{.48}W_{.48}$ and the BET s.a. analysis was 154 m²/g with a pore volume of 0.40 cc/g.

Example E13—$Co_2VO_x$ New Phase 5

New phase #5 $Co_2VO_x$ was prepared by adding 13.333 g Alfa Chemical's 99.0% grade $CoCO_3$ and 5.160 g Sigma Aldrich $V2O5$ to 500 mL water. Diluted $CoNb_{0.5}W_{0.5}O_x$ was used to adjust the solution pH to 10.1. The total amount of $CoNb_{0.5}W_{0.5}O_x$ added was 50.11 g. The mixture was refluxed at around 100° C. and aged for 4 days. The product was filtered and spread in a thin layer to dry at 100° C. overnight. Following filtration, 13.862 g of brown powder was obtained as the solid product, and the filtrate was very light yellow but clear. The final elemental analysis on solid powder indicated a Co to V ratio as Co2.3V1 and the BET analysis indicated a surface area of 129.3 m2/g with a pore volume of 0.32 cc/g.

Using cobalt carbonate and tungstic acid, or MoO3, or V2O5, or Nb2O3 at the desired ratio to achieve the indicated composition, hydrothermal reactions were carried out at each specific synthesis condition to obtain pure metastable phase. Synthesis conditions, elemental analysis and surface area of Examples E1, E5, E8, E9, E10, and E11 is summarized in Table 1 below.

TABLE 1

| Example | Synthesis condition | Ratio from elemental analysis | Surface area (m²/g) |
| --- | --- | --- | --- |
| E1 | 100° C. for 5 days | $Co_1W_{.95}$ | 113.9 |
| E5 | 100° C. for 5 days | $Co_{1.2}Mo_{.60}W_{.69}$ | 113.7 |
| E8 | 100° C. for 4 days at pH 9 | $Co_{1.2}V_{.40}W_{.51}$ | 104.6 |
| E9 | 150° C. for 6 hr at pH 9 | $Co_1Nb_{.19}W_{.55}$ | 37.4 |
| E10 | 100° C. for 30 min | $Co_{1.61}W_1$ | 86 |
| E11 | 100° C. for 15 min | $Co_2Mo_{.45}W_{.45}$ | 131.7 |

XRD for examples E1, E5, E8, E9, E10, and E11 were obtained and summarized in FIG. 2.

Catalyst Loading

Each of the powder catalysts was pelletized in a hydraulic press at 15,000 psi for 3 minutes, then crushed and sieved to 35/60 mesh. 3.0 cc of the sized chips were mixed with 3.0 cc of 35/60 mesh Davisil 646 SiO2 to give a 1 to 1 catalyst to diluent ratio. This catalyst and diluent mixture was then loaded into a stainless steel U-shaped reactor with quartz wool at the inlet, and quartz wool and a fritted glass disc at the outlet. The reactor was then loaded into a sandbath and run in upflow mode.

Sulfidation Conditions

Two parallel reactors were configured as continuously stirred reactors (CSR) and placed in an up flow mode. The charged reactors were pressure-tested with N2, and with H2 at 600 psig at 25° C. Then with H2 flowing at 50 cc/min, the temperature was raised to 100° C. At 100° C., the pressure was maintained at 100 psig, H2 flow was stopped, and a sulfiding feed of 7.5 wt % of dimethyl disulfide dissolved in a diesel was flowed at 8 ml/h over each catalyst for 4 hours. Then, with the sulfiding feed continuing, 24 L/hr H2 (48 sccm per each reactor) was added to each reactor, and the pressure raised to 41.4 bar. The temperature was then increased to 200° C. over 1.5 hours, and then to 235° C. over 2 hours. The reactor was held isothermal at 235° C. for 16 hours. Following the isothermal hold, the temperature was raised to 290° C. over a period of 10 hours, then raised to 340° C. over 2 hours and held isothermal for 10 hours. The ramp rate and final hold time at temperature were varied up to 1 hr.

Gas Phase Sulfiding

For gas phase sulfiding reactions, 2-4 g of the different precursors in either dried or calcined states were placed in a quartz boat which was in turn inserted into a horizontal quartz tube and placed into a Lindberg furnace. While still at room temperature, a flow of 240 cm3/min of 10% H2S/H2 was admitted for 15 minutes, and then the temperature was raised to a nominal 400° C. in 45 minutes with 10% H2S/H2 flowing at 240 cm3/min Calibration of this temperature showed it to be closer to 380° C. This flow was continued for 2 hours at 400° C. The sample was then cooled in flowing 10% H2S/H2 to room temperature and held at room temperature for 30 minutes at the same flow. After the sample was purged with 300 cm3/min of flowing N2 for 30 minutes, a 1% O2 in argon passivation gas was introduced at 50 cm3/min at room temperature and passed over the catalyst overnight. The sample was then removed from the furnace.

Figure 3:
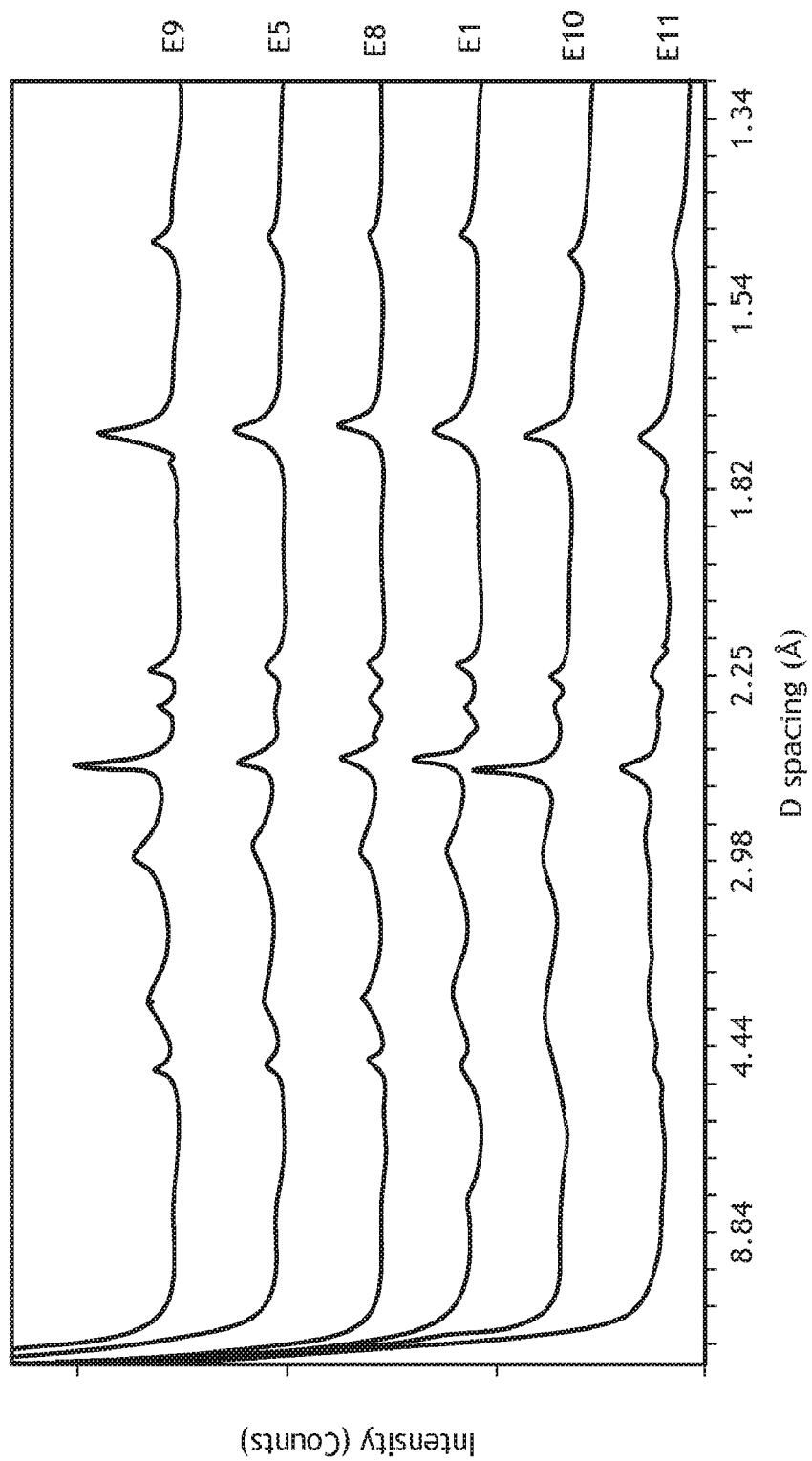
FIG. 3 shows the X-ray diffraction patterns of the catalysts of Examples E1, E5, E8, E9, E10, and E11 that may incorporate one or more principles of the present disclosure.

XRD of selected sulfided samples (through H2S gas phase sulfidation) were collected indicating the fresh active phases. FIG. 3 shows a graph of these patterns and, in particular, the broadening of the 002 peak from $CoWO_x$ sulfided to $CoWO_x$ with stearylamine sulfided to $CoWO_x$ with stearylamine and sulfur sulfided. The broadening of the 002 peak is a necessary but not a sufficient condition for higher activity.

Diesel Feedstocks

Two different feeds were used in testing the catalysts in the hydrotreating of diesel feedstocks. The properties of these two feeds are shown in Table 2.

TABLE 2

| Feed | A | B |
|---|---|---|
| API | 33.86 | 34.46 |
| S, wt % | 1.22 | 0.738 |
| N, wppm | 168 | 186 |
| Simulated Distillation ASTM D 86 | | |
| .5 PCT | 238° F. (114° C.) | 395° F. (202° C.) |
| 5 PCT | 357° F. (180° C.) | 487° F. (253° C.) |
| 10 PCT | 406° F. (208° C.) | 512° F. (267° C.) |
| 20 PCT | 459° F. (237° C.) | 539° F. (282° C.) |
| 30 PCT | 505° F. (263° C.) | 562° F. (294° C.) |
| 40 PCT | 540° F. (282° C.) | 580° F. (304° C.) |
| 50 PCT | 569° F. (298° C.) | 601° F. (316° C.) |
| 60 PCT | 593° F. (312° C.) | 625° F. (329° C.) |
| 70 PCT | 619° F. (326° C.) | 652° F. (344° C.) |
| 80 PCT | 650° F. (343° C.) | 682° F. (361° C.) |
| 90 PCT | 685° F. (363° C.) | 717° F. (380° C.) |
| 95 PCT | 714° F. (379° C.) | 740° F. (393° C.) |
| 99 PCT | 768° F. (409° C.) | 769° F. (409° C.) |
| 99.5 PCT | 788° F. (420° C.) | 779° F. (415° C.) |

Testing of Sulfided Catalysts

The sulfided catalysts of the precursors prepared in Examples E1-E13 were tested under varying run conditions including the reactor temperature, pressure, liquid hourly space velocity (LHSV) and treat gas ratio (TGR). LHSV is changed by increasing or decreasing the liquid flow rate, and TGR is changed by varying the ratio of hydrogen to liquid flow rates.

Example 14

Figure 4:
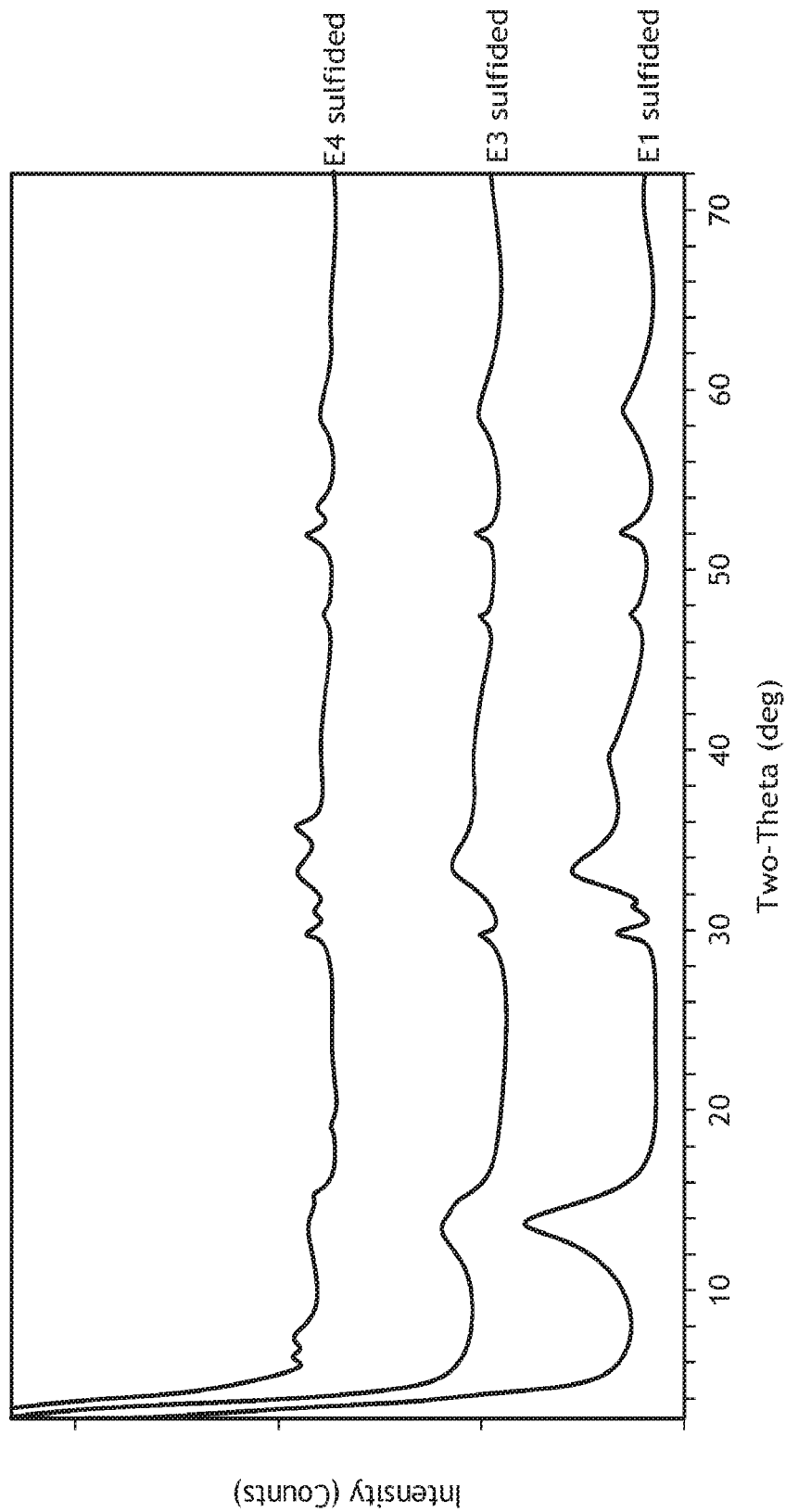
FIG. 4 shows the X-ray diffraction patterns of the sulfided samples of Examples E1, E3, and E4 that may incorporate one or more principles of the present disclosure.

FIG. 4 shows a graph of the S and N contents in product were measured in function of the days on stream for the catalyst prepared in E1 using a catalyst weight of 3.856 g, a catalyst chip density of 1.29 g/cc, and the following changes of conditions:
  CHD1: Feed A, 0.5 LHSV, 635° F. (335° C.), 600 psig, 1000 scf/b
  CHD2: Feed A, 0.5 LHSV, 635° F. (335° C.), 300 psig, 1000 scf/b
  CHD3: Feed A, 0.5 LHSV, 635° F. (335° C.), 450 psig, 1000 scf/b
  CHD4: Feed A, 1.0 LHSV, 635° F. (335° C.), 450 psig, 1000 scf/b
  CHD5: Feed A, 1.0 LHSV, 635° F. (335° C.), 600 psig, 1000 scf/b
  CHD6: Feed A, 0.5 LHSV, 635° F. (335° C.), 600 psig, 1000 scf/b
  CHD7: Feed A, 0.4 LHSV, 635° F. (335° C.), 600 psig, 1000 scf/b Example 15

Figure 5:
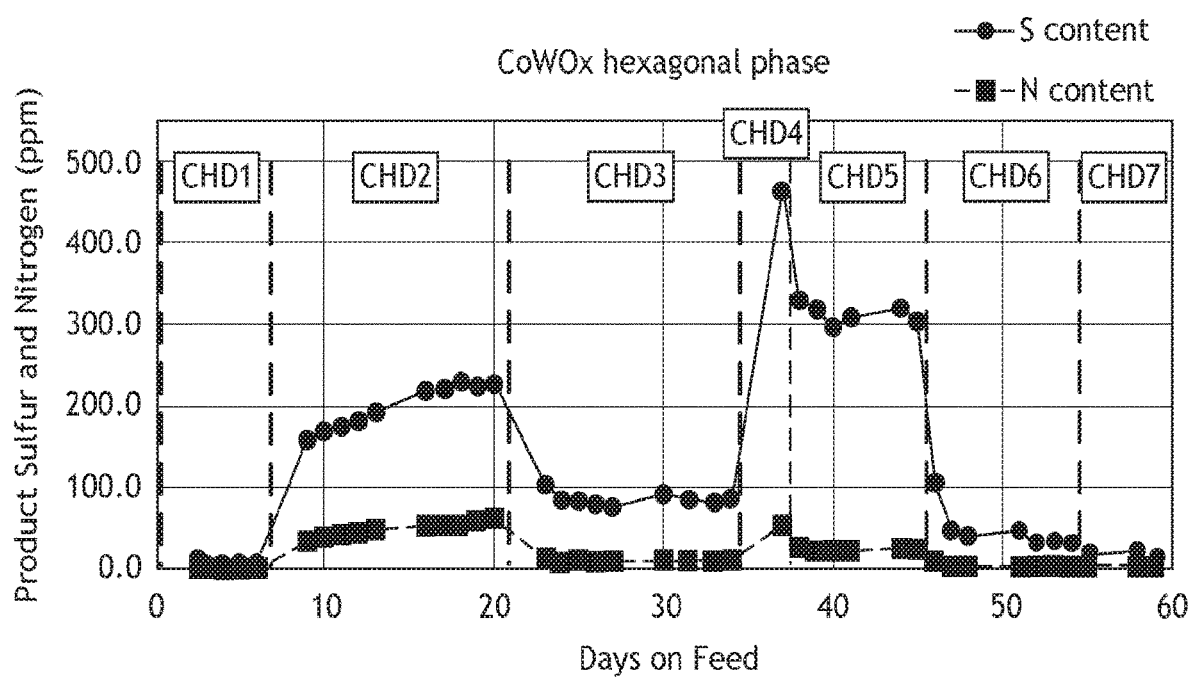
FIG. 5 shows the S and N contents in function of the days on feed at various reactor testing conditions using the catalyst of Example E1 that may incorporate one or more principles of the present disclosure.

FIG. 5 shows a graph of the S and N contents in product were measured in function of the days on stream for the catalyst prepared in E2 using a catalyst weight of 3.927 g, a catalyst chip density of 1.31 g/cc, and the following changes of conditions:
  CHD1: Feed A, 0.5 LHSV, 635° F. (335° C.), 600 psig, 1000 scf/b
  CHD2: Feed A, 0.5 LHSV, 635° F. (335° C.), 300 psig, 1000 scf/b Example 16

Figure 6:
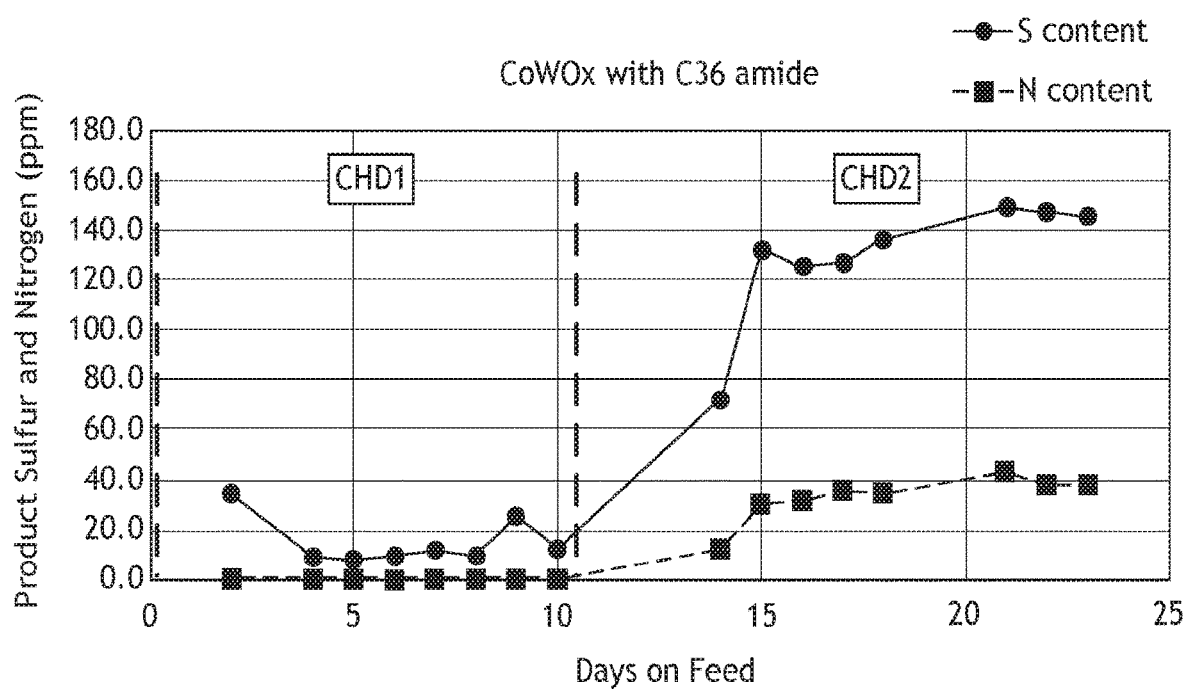
FIG. 6 shows the S and N contents in function of the days on feed at various reactor testing conditions using the catalyst of Example E2 that may incorporate one or more principles of the present disclosure.

FIG. 6 shows a graph of the S and N contents in product were measured in function of the days on stream for the catalyst prepared in E3 using a catalyst weight of 5.122 g, a catalyst chip density of 1.71 g/cc, and the following changes of conditions:
  CHD1: Feed A, 0.5 LHSV, 635° F. (335° C.), 300 psig, 1000 scf/b
  CHD2: Feed A, 1.0 LHSV, 635° F. (335° C.), 600 psig, 1000 scf/b
  CHD3: Feed A, 0.5 LHSV, 635° F. (335° C.), 150 psig, 1000 scf/b Example 17

Figure 7:
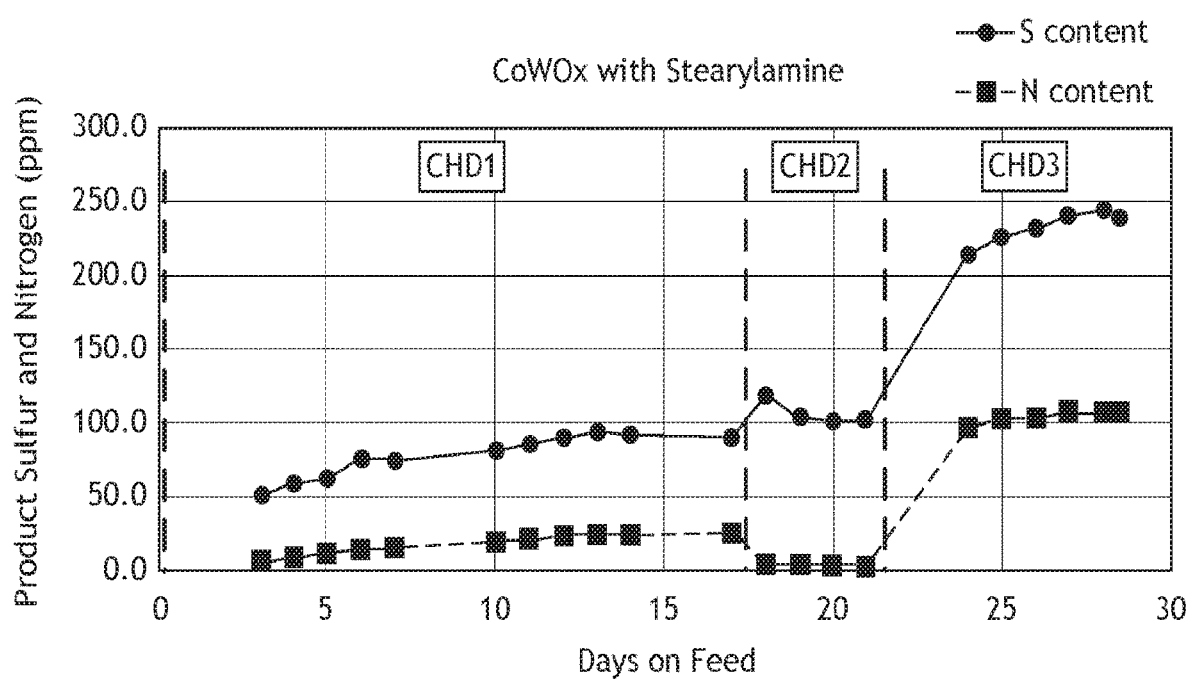
FIG. 7 shows the S and N contents in function of the days on feed at various reactor testing conditions using the catalyst of Example E3 that may incorporate one or more principles of the present disclosure.

FIG. 7 shows a graph of the S and N contents in product were measured in function of the days on stream for the catalyst prepared in E4 using a catalyst weight of 4.612 g, a catalyst chip density of 1.54 g/cc, and the following changes of conditions:
  CHD1: Feed A, 0.5 LHSV, 635° F. (335° C.), 600 psig, 1000 scf/b
  CHD2: Feed A, 0.5 LHSV, 635° F. (335° C.), 300 psig, 1000 scf/b Example 18

Figure 8:
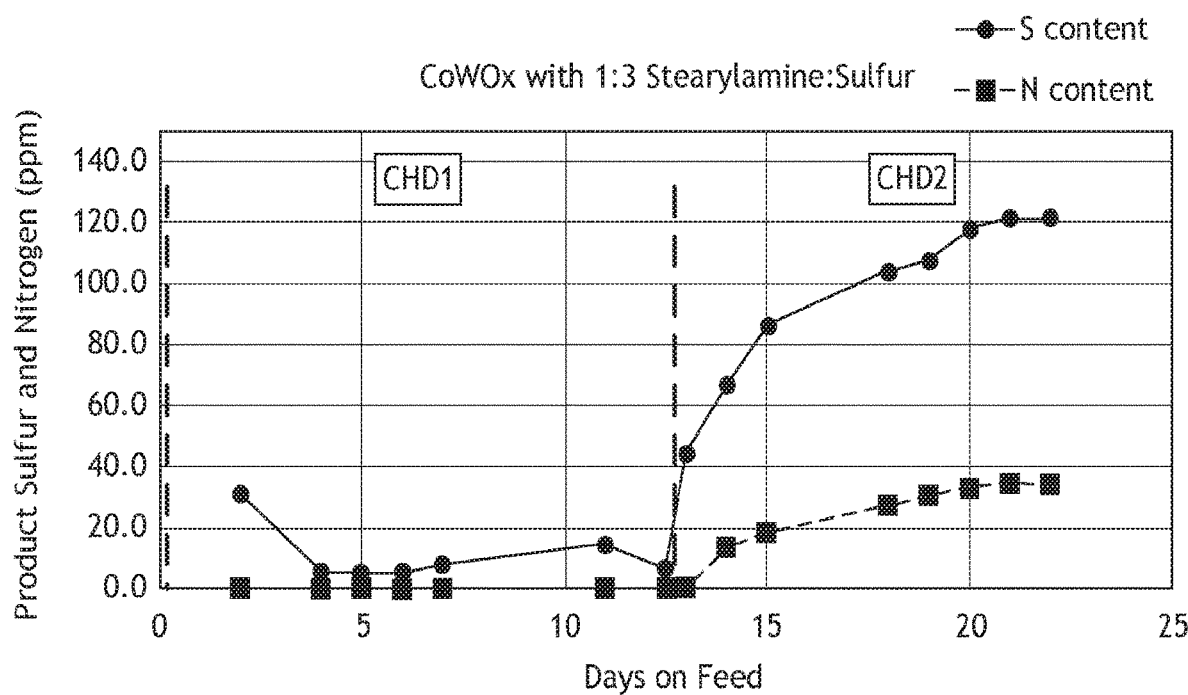
FIG. 8 shows the S and N contents in function of the days on feed at various reactor testing conditions using the catalyst of Example E4 that may incorporate one or more principles of the present disclosure.

FIG. 8 shows a graph of the S and N contents in product were measured in function of the days on stream for the catalyst prepared in E5 using a catalyst weight of 4.217 g, a catalyst chip density of 1.41 g/cc, and the following changes of conditions:
  CHD1: Feed A, 0.5 LHSV, 635° F. (335° C.), 600 psig, 1000 scf/b
  CHD2: Feed A, 0.5 LHSV, 635° F. (335° C.), 300 psig, 1000 scf/b
  CHD3: Feed A, 1.0 LHSV, 635° F. (335° C.), 600 psig, 1000 scf/b Example 19

Figure 9:
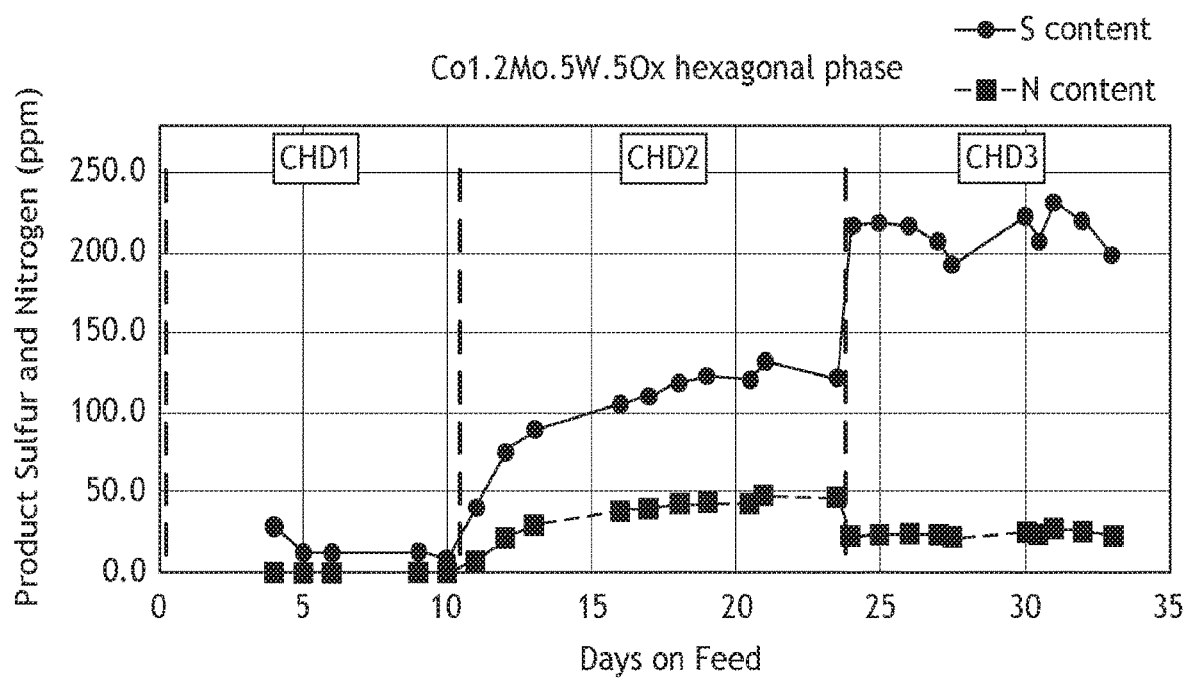
FIG. 9 shows the S and N contents in function of the days on feed at various reactor testing conditions using the catalyst of Example E5 that may incorporate one or more principles of the present disclosure.

FIG. 9 shows a graph of the S and N contents in product were measured in function of the days on stream for the catalyst prepared in E6 using a catalyst weight of 5.014 g, a catalyst chip density of 1.67 g/cc, and the following changes of conditions:
- CHD1: Feed A, 0.5 LHSV, 635° F. (335° C.), 300 psig, 1000 scf/b
- CHD2: Feed A, 1.0 LHSV, 635° F. (335° C.), 600 psig, 1000 scf/b
- CHD3: Feed A, 0.5 LHSV, 635° F. (335° C.), 150 psig, 1000 scf/b Example 20

Figure 10:
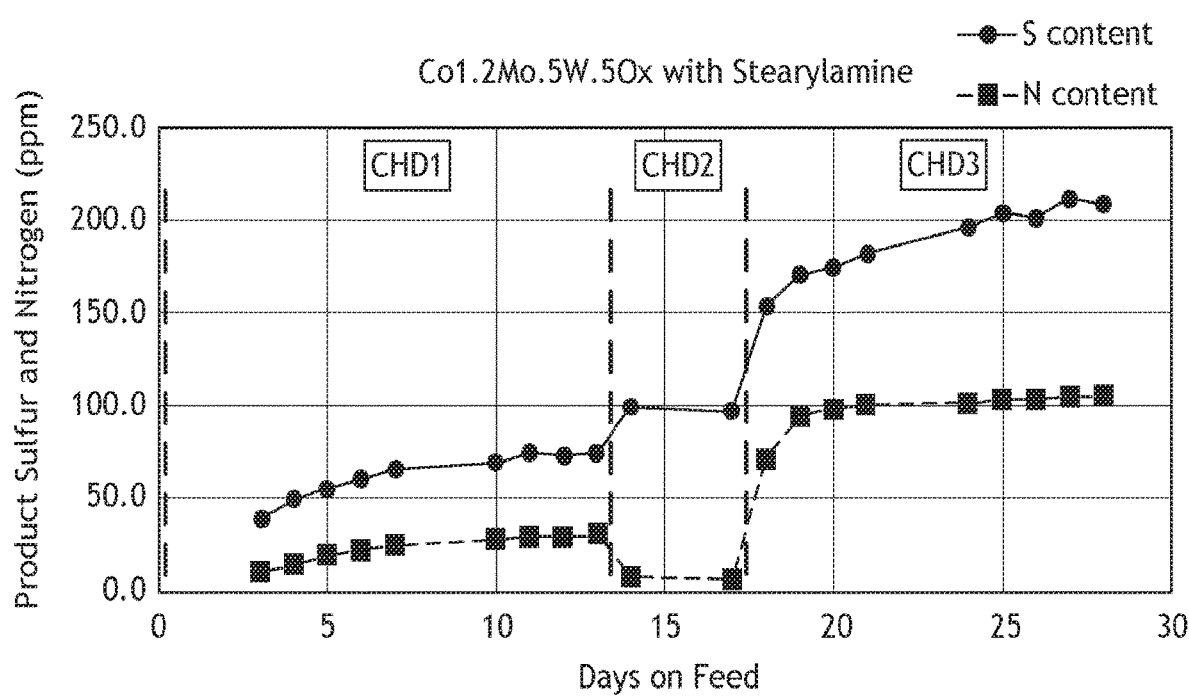
FIG. 10 shows the S and N contents in function of the days on feed at various reactor testing conditions using the catalyst of Example E6 that may incorporate one or more principles of the present disclosure.

FIG. 10 shows a graph of the S and N contents in product were measured in function of the days on stream for the catalyst prepared in E7 using a catalyst weight of 4.097 g, a catalyst chip density of 1.37 g/cc, and the following changes of conditions:
- CHD1: Feed A, 0.5 LHSV, 635° F. (335° C.), 600 psig, 1000 scf/b
- CHD2: Feed A, 0.5 LHSV, 635° F. (335° C.), 300 psig, 1000 scf/b
- CHD3: Feed A, 1.0 LHSV, 635° F. (335° C.), 600 psig, 1000 scf/b Example 21

Figure 11:
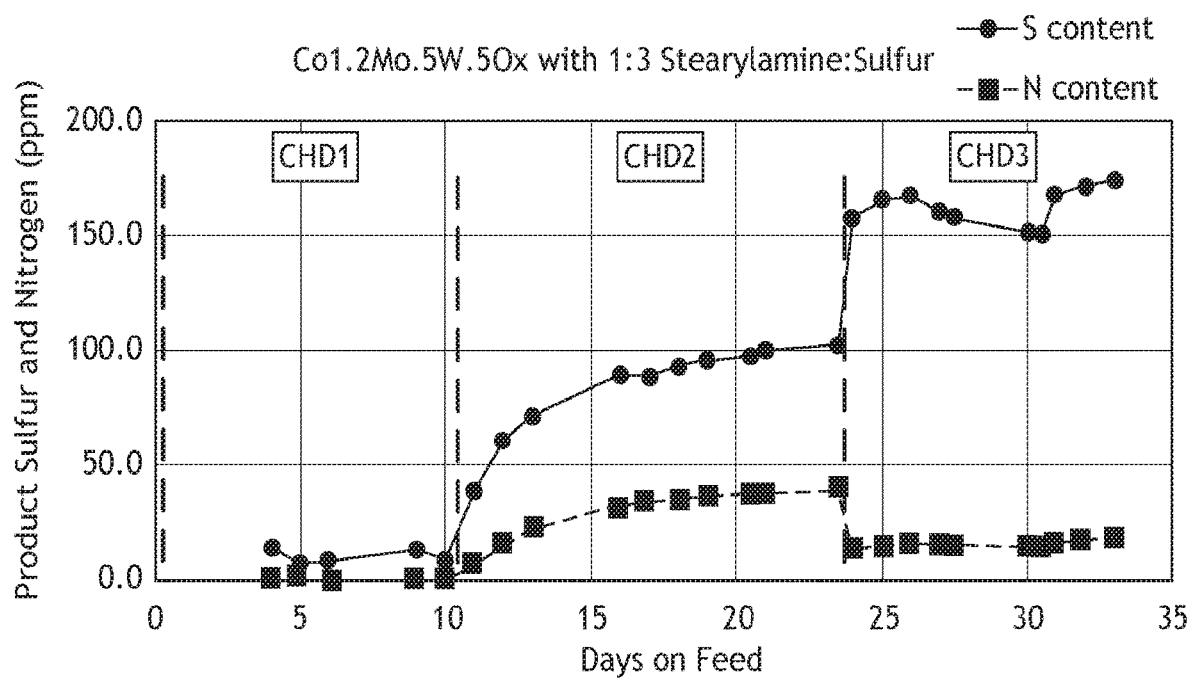
FIG. 11 shows the S and N contents in function of the days on feed at various reactor testing conditions using the catalyst of Example E7 that may incorporate one or more principles of the present disclosure.

FIG. 11 shows a graph of the S and N contents in product were measured in function of the days on stream for the catalyst prepared in E8 using a catalyst weight of 4.055 g, a catalyst chip density of 1.35 g/cc, and the following changes of conditions:
- CHD1: Feed A, 0.5 LHSV, 635° F. (335° C.), 300 psig, 1000 scf/b
- CHD2: Feed A, 0.5 LHSV, 635° F. (335° C.), 600 psig, 1000 scf/b Example 22

Figure 12:
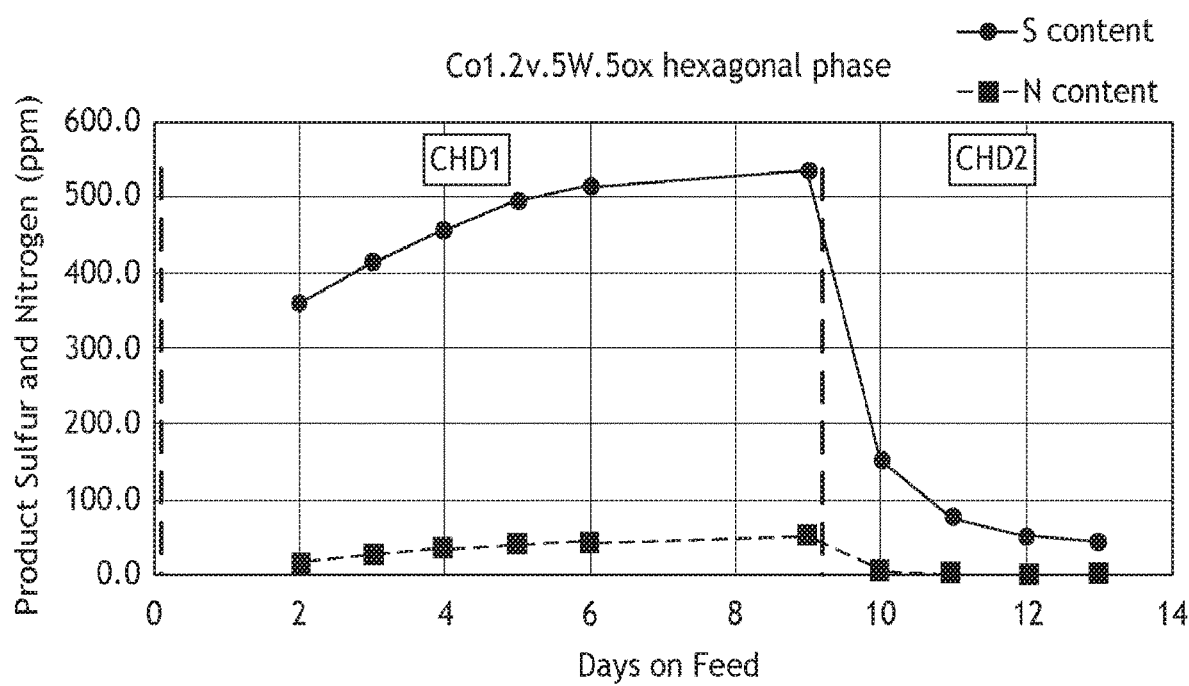
FIG. 12 shows the S and N contents in function of the days on feed at various reactor testing conditions using the catalyst of Example E8 that may incorporate one or more principles of the present disclosure.

FIG. 12 shows a graph of the S and N contents in product were measured in function of the days on stream for the catalyst prepared in E9 using a catalyst weight of 4.948 g, a catalyst chip density of 1.65 g/cc, and the following changes of conditions:
- CHD1: Feed A, 0.5 LHSV, 635° F. (335° C.), 300 psig, 1000 scf/b
- CHD2: Feed A, 1.0 LHSV, 635° F. (335° C.), 600 psig, 1000 scf/b Example 22

Figure 13:
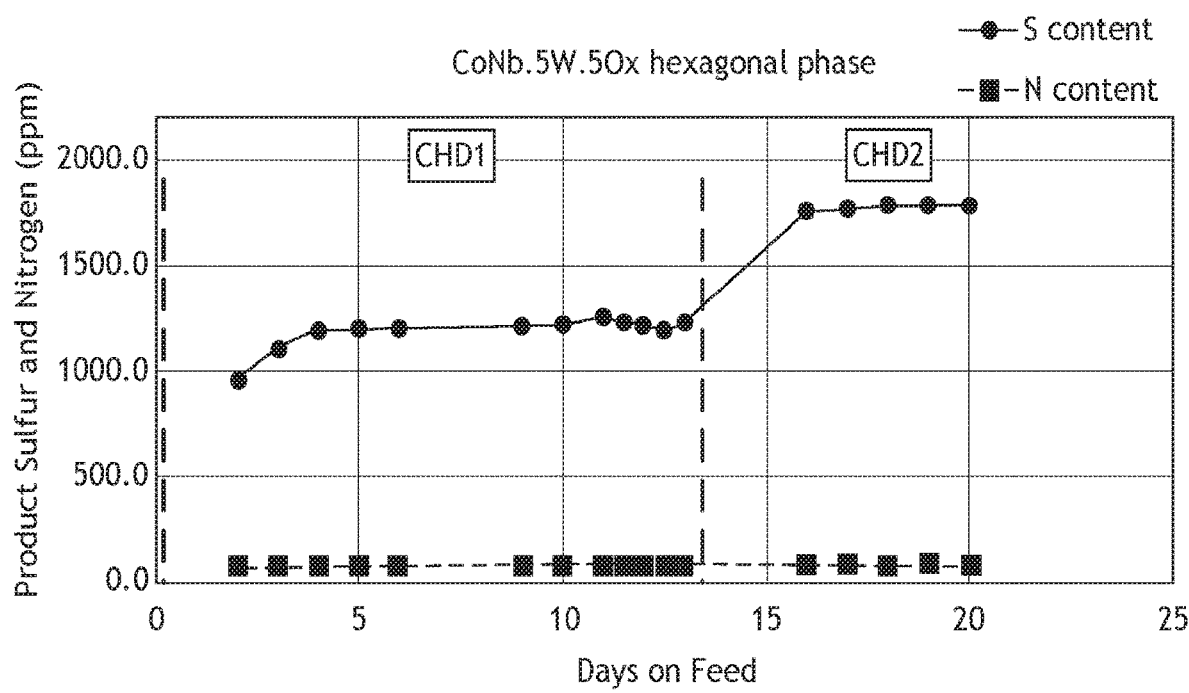
FIG. 13 shows the S and N contents in function of the days on feed at various reactor testing conditions using the catalyst of Example E9 that may incorporate one or more principles of the present disclosure.

FIG. 13 shows a graph of the S and N contents in product were measured in function of the days on stream for the catalyst prepared in E10 using a catalyst weight of 3.832 g, a catalyst chip density of 1.28 g/cc, and the following changes of conditions:
- CHD1: Feed A, 0.5 LHSV, 635° F. (335° C.), 300 psig, 1000 scf/b
- CHD2: Feed A, 1.0 LHSV, 635° F. (335° C.), 600 psig, 1000 scf/b Example 23

Figure 14:
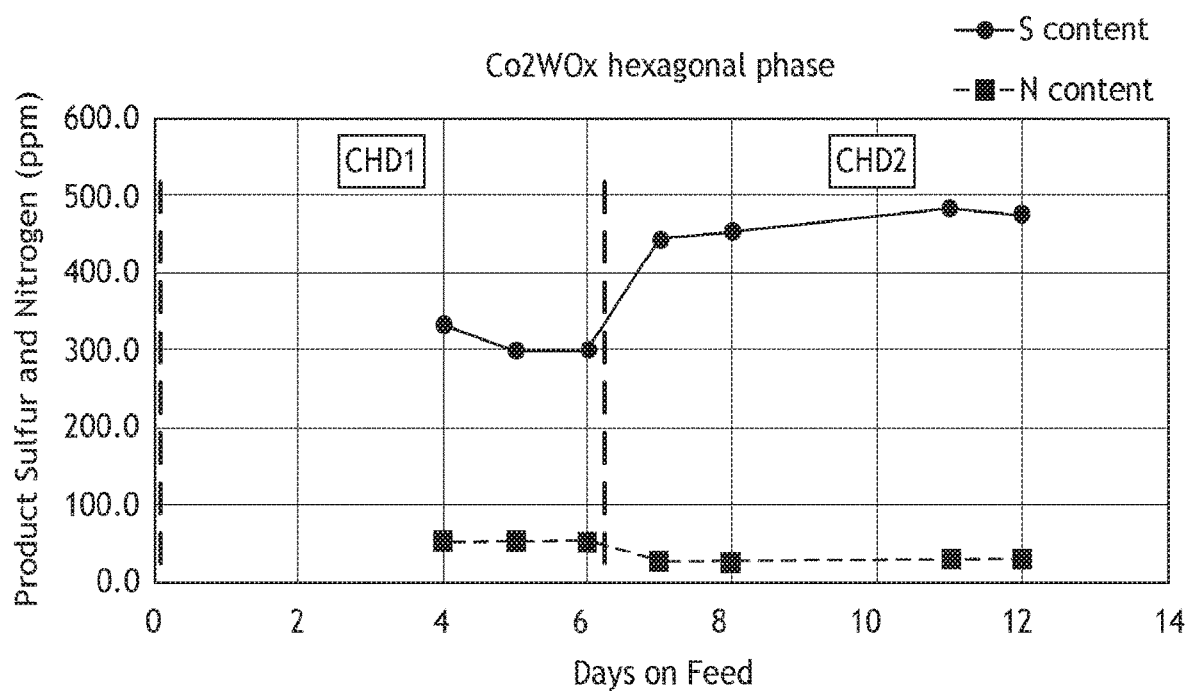
FIG. 14 shows the S and N contents in function of the days on feed at various reactor testing conditions using the catalyst of Example E10 that may incorporate one or more principles of the present disclosure.

FIG. 14 shows a graph of the S and N contents in product were measured as a function of the days on stream for the catalyst prepared in E11 using a catalyst weight of 3.203 g, a catalyst chip density of 1.07 g/cc, and the following changes of conditions:
- CHD1: Feed A, 0.5 LHSV, 635° F. (335° C.), 300 psig, 1000 scf/b
- CHD2: Feed A, 1.0 LHSV, 635° F. (335° C.), 600 psig, 1000 scf/b Example 24

Figure 15:
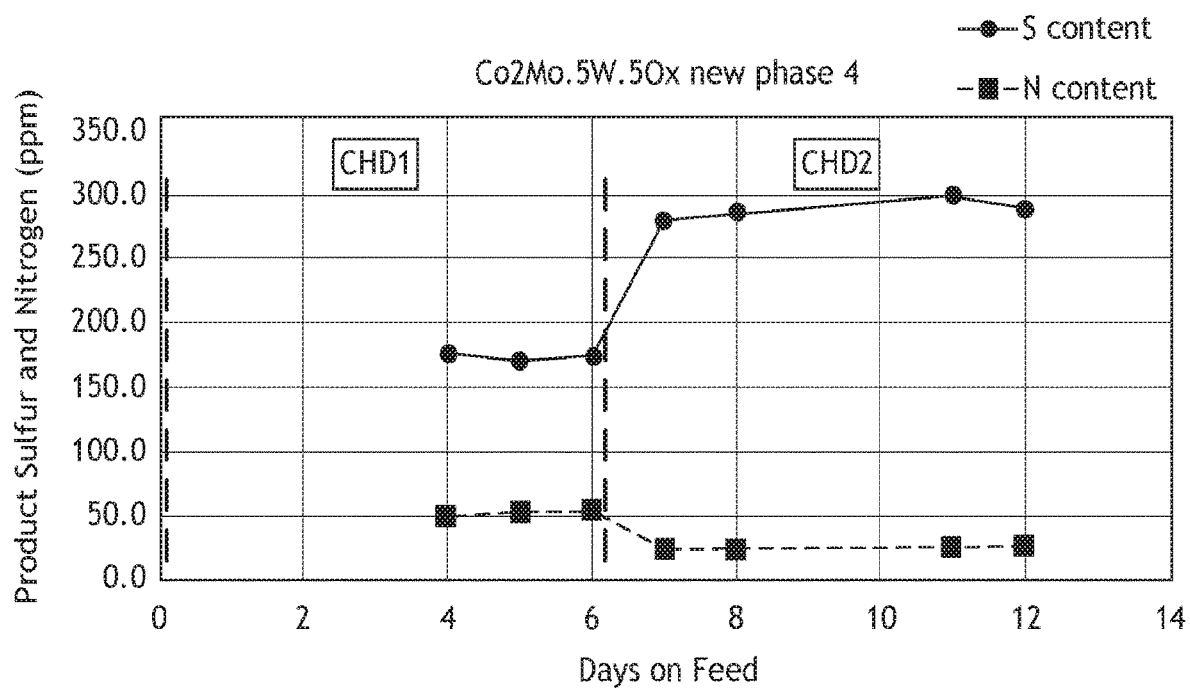
FIG. 15 shows the S and N contents in function of the days on feed at various reactor testing conditions using the catalyst of Example E11 that may incorporate one or more principles of the present disclosure.

FIG. 15 shows a graph of the S and N contents in product were measured as a function of the days on stream for the catalyst prepared in E12 using a catalyst weight of 3.031 g, a catalyst chip density of 1.01 g/cc, and the following changes of conditions:
- CHD1: Feed A, 0.5 LHSV, 635° F. (335° C.), 300 psig, 1000 scf/b
- CHD2: Feed A, 1.0 LHSV, 635° F. (335° C.), 600 psig, 1000 scf/b Example 25

Figure 16:
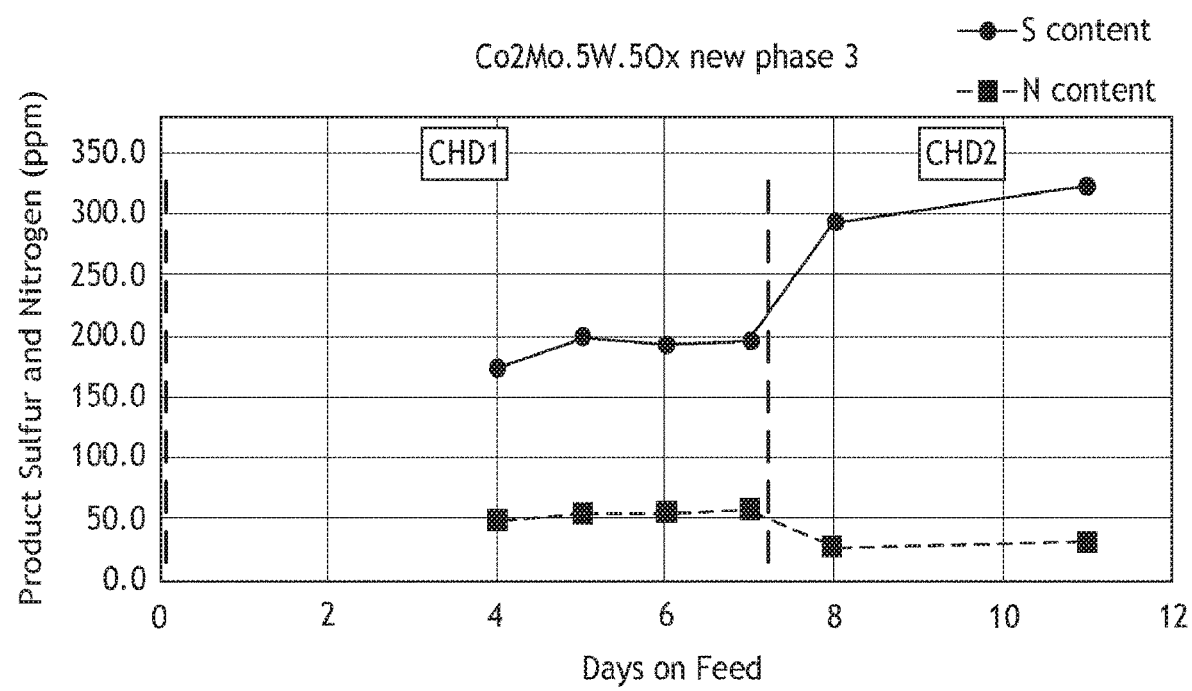
FIG. 16 shows the S and N contents in function of the days on feed at various reactor testing conditions using the catalyst of Example E12 that may incorporate one or more principles of the present disclosure.

FIG. 16 shows a graph of the S and N contents in product were measured as a function of the days on stream for the catalyst prepared in E13 using a catalyst weight of 3.224 g, a catalyst chip density of 1.07 g/cc, and the following changes of conditions:
- CHD1: Feed A, 0.5 LHSV, 635° F. (335° C.), 300 psig, 1000 scf/b
- CHD2: Feed A, 0.5 LHSV, 635° F. (335° C.), 600 psig, 1000 scf/b Table 3 presents the diesel hydroprocessing results for the W-containing catalysts with stearylamine E3 and E6 in terms of sulfur and nitrogen contents in the products at conditions CHD1, CHD2, and CHD3, wherein relative volume activity (RVA), based on the total catalyst amount loaded in the reactor, RVA is in respect to commercial hydroprocessing reference catalyst C1 [S, n=1.3; N, n=1.0], where N represents the reaction order and S is sulfur conversion.

TABLE 3

| Catalyst | CHD1 | | CHD2 | | CHD3 | |
| --- | --- | --- | --- | --- | --- | --- |
|  | S | N | S | N | S | N |
| E3 | 1.06 | 1.52 | 1.19 | 1.71 | 0.89 | 1.00 |
| E6 | 1.14 | 1.42 | 1.22 | 1.53 | 0.95 | 1.04 |

Figure 17:
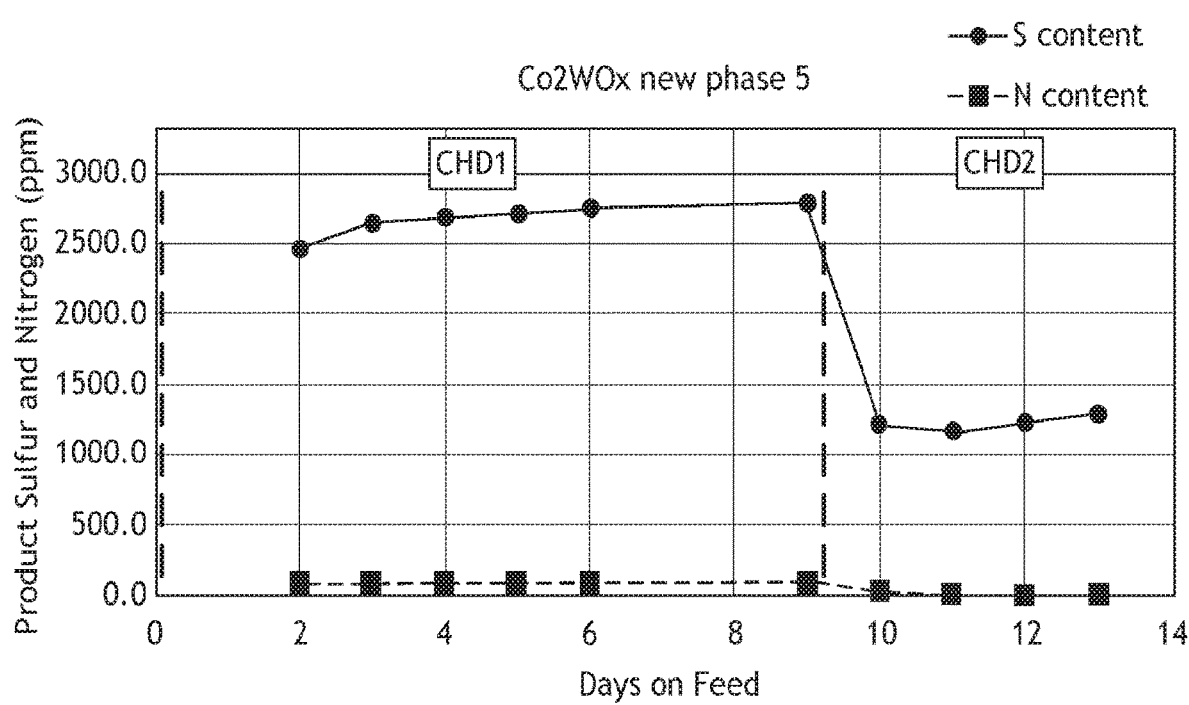
FIG. 17 shows the S and N contents in function of the days on feed at various reactor testing conditions using the catalyst of Example E13 that may incorporate one or more principles of the present disclosure.

FIG. 17 illustrates the impact of the organic chelate on the total liquid product (TLP) S (ppm). The overall trend provides a decreasing amount of S with organic decoration of catalyst ranking as follows: inorganic only <inorganic with C36 amide<inorganic with C18 stearylamine and sulfur<inorganic with C18 stearylamine only. The difference between the latter two could be however due to the difficulty of doing incipient wetness due to the large viscosity increase with the addition of sulfur. With higher viscosity, the solution may not have wet all crystallite surfaces well.

Figure 18:
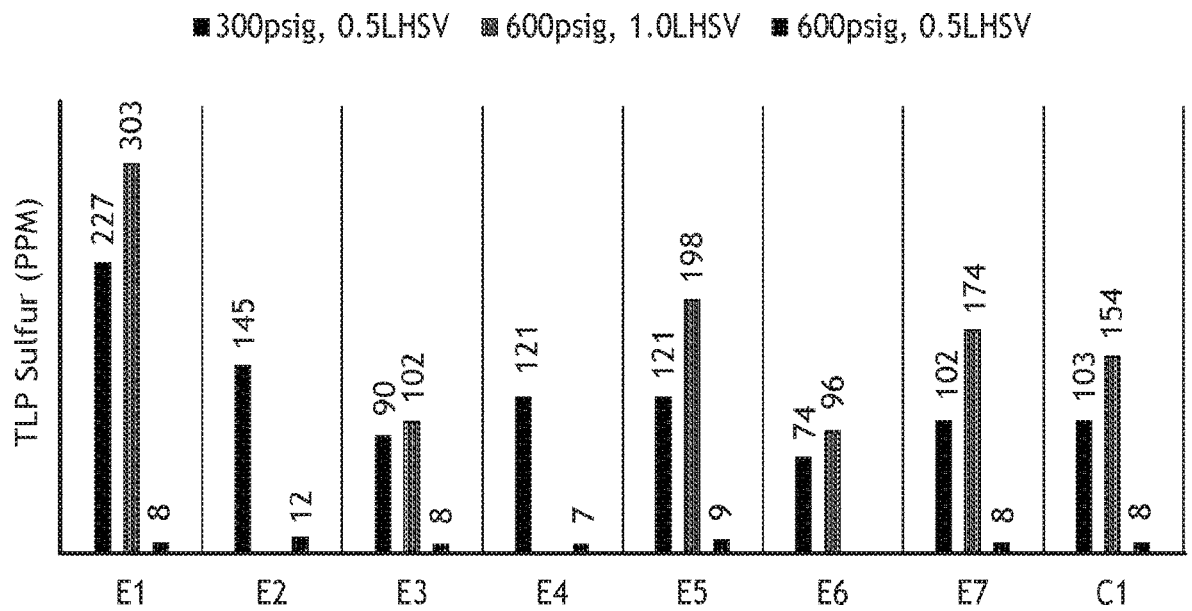
FIG. 18 shows bar graphs of the total liquid product S (ppm) in testing reactions using the catalysts of Examples E1-E7 and reference catalyst under 3 sets of reactor conditions that may incorporate one or more principles of the present disclosure.

FIG. 18 illustrates the impact of the transition metals (for catalysts without organic chelates) on the TLP S and N. Mo substitution of W is by far the most active. The overall rank is Mo>W>>V>>Nb in CoW.5M.5 system where M is W, Mo, V, or Nb.

Figure 19:
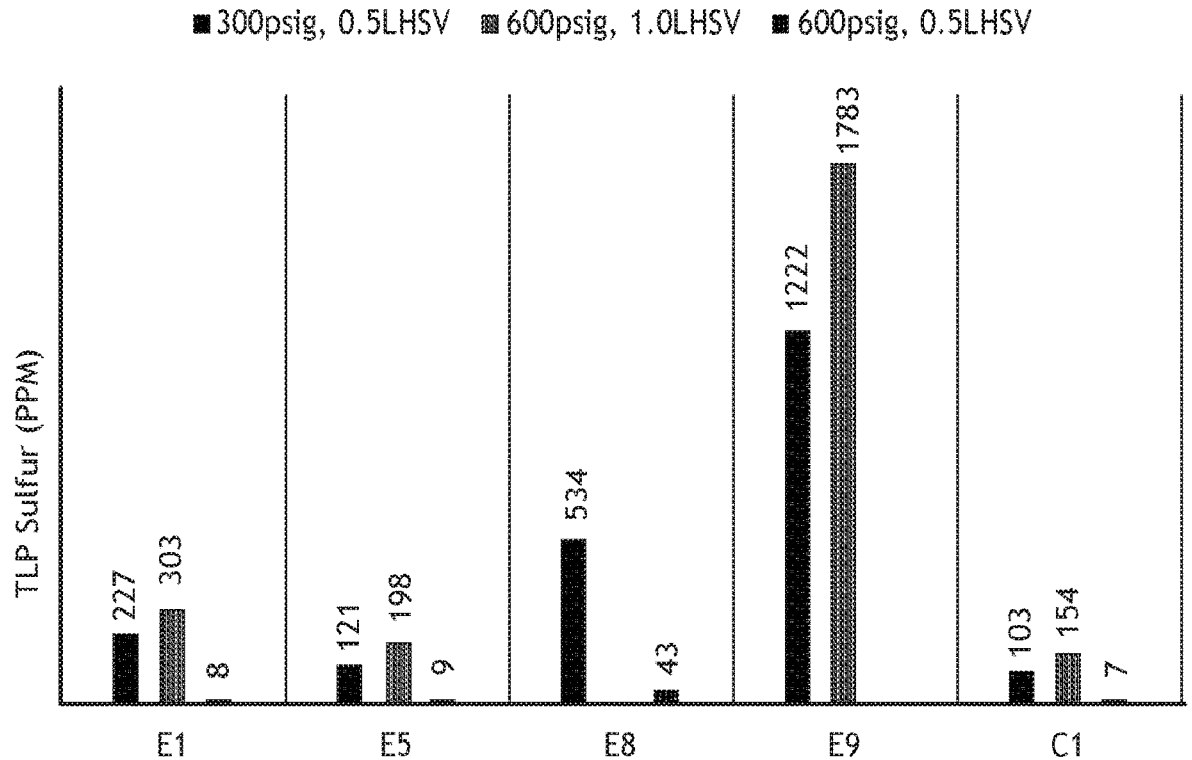
FIG. 19 shows bar graphs of the total liquid product S (ppm) in testing reactions using the catalysts of Examples E1, E5, E8, E9, and reference catalyst under 3 sets of reactor conditions that may incorporate one or more principles of the present disclosure.

FIG. 19 illustrates the impact of Groups 8-10 to -Group 6 metal ratio on the TLP S and N. Co1.2Mo.5W.5 is more active than Co2Mo.5W.5, and Co1W1 is also more active than Co2W1. Further, Co2Mo is more active than Co1.2Mo.

Figure 20:
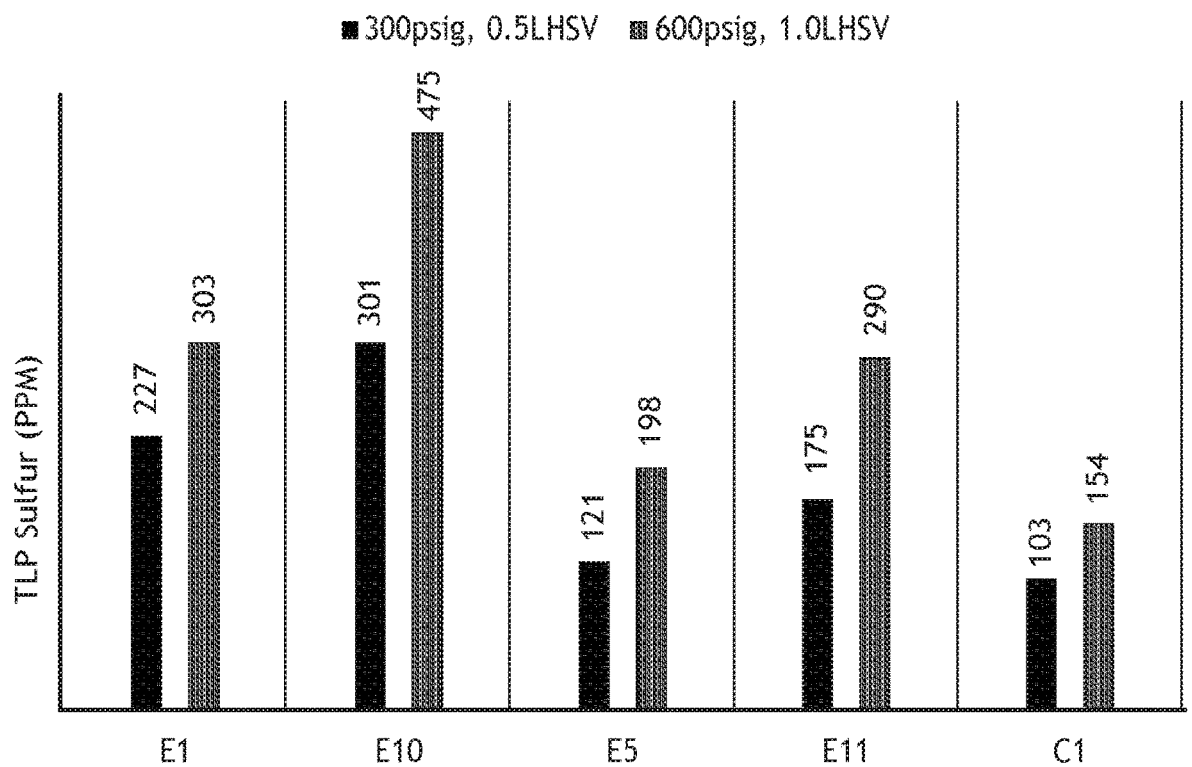
FIG. 20 shows bar graphs of the total liquid product S (ppm) in testing reactions using the catalysts of Examples E1, E5, E10, E11 and reference catalyst under 2 sets of reactor conditions that may incorporate one or more principles of the present disclosure.
Figure 21:
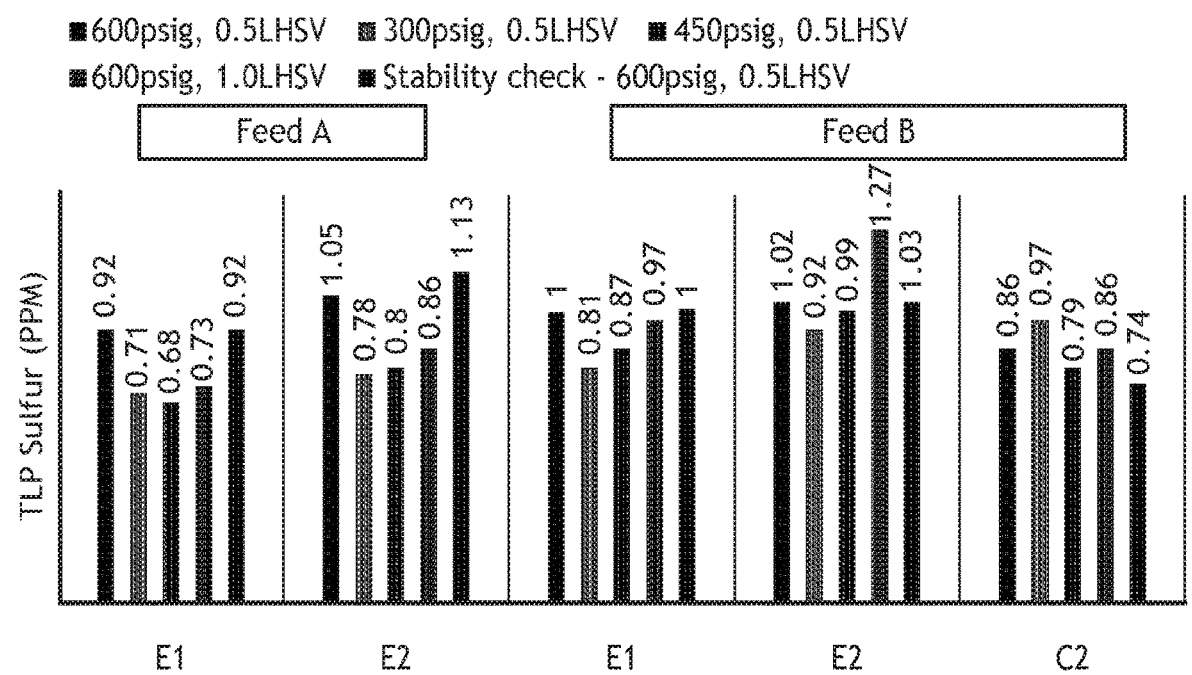
FIG. 21 shows bar graphs of the total liquid product S RVA to commercial hydrotreatment reference catalyst C1 in testing reactions using the catalysts of Examples E1 and E2, and commercial reference catalyst C2 under 5 sets of reactor conditions that may incorporate one or more principles of the present disclosure.

FIG. 20 illustrates the impact of feed variations on the TLP S and N RVA to a commercial catalyst C2. The bar graph shows that bulk catalyst CoW or CoW with amide are more stable throughout a 6 weeks+ run conditions in either Feed A or Feed B. In general, Feed B improved the relative catalyst performance more so than Feed A under the same conditions. For example, at 300 psig LHSV 0.5, CoW exhibited 0.71RVA HDS under Feed A, but 0.81 RVA HDS under Feed B compared to C1. This difference is exemplified at higher pressure and when catalyst is chelated by a chelant composition at 600 psig LHSV 1.0, CoW with C36 organic gives RVA HDS from Feed A, vs 1.27 RVA HDS in Feed B.

As demonstrated in the above examples, Co1.2Mo0.5W0.5 prepared in accordance with the disclosed methods exhibits increased catalyst activity over CoW, Co2W, or Co2Mo0.5W0.5 in all cases (with or without amide/amine chelants) when compared by RVA.

EMBODIMENTS

The present disclosure provides, among others, the following examples, each of which may be considered as optionally including any alternate example.

Clause 1. A composition comprising a compound having a formula: $Co_yW_{1-x}M_xO_4$ (I), wherein M is Mo, V, or Nb; $0.5 \geq x \geq 0$; and $1 \leq y \leq 4$; and wherein the compound has an X-ray powder diffraction pattern comprising characteristic diffraction peaks having d-spacing values of about 2.90 Å, 2.56 Å, and 1.73 Å.

Clause 2. The composition of clause 1, wherein the compound is prepared by hydrothermally reacting tungstic acid and cobalt carbonate, wherein the cobalt carbonate has an X-ray powder diffraction pattern comprising characteristic diffraction peaks having d-spacing values of about 10.03 Å, 5.91 Å, 4.35 Å, and 4.21 Å.

Clause 3. The composition of any one of clauses 1-2, further comprising a chelant containing at least 10 carbon atoms.

Clause 4. The composition of any one of clauses 1-3, wherein the chelant contains at least 15 carbon atoms.

Clause 5. The composition of any one of clauses 1-4, wherein the chelant comprises an amine or an amide functional group.

Clause 6. The composition of any one of clause 1-5, wherein the chelant is stearylamine Clause 7. The composition of clause 6, further comprising elemental sulfur.

Clause 8. The composition of any one of clause 1-5, wherein the chelant is an amide having at least 10 carbons.

Clause 9. A bulk catalyst composition produced by sulfiding the composition of any one of clauses 1-9.

Clause 10. The use of the bulk catalyst composition or sulfided bulk catalyst composition of any one of clauses 1-9 for the hydrotreatment of a hydrocarbon feedstock.

Clause 11. A method of making a bulk catalyst composition comprising (i) combining tungstic acid and cobalt carbonate and (ii) reacting the tungstic acid and cobalt carbonate to form a catalyst composition, wherein the cobalt carbonate has an X-ray powder diffraction pattern comprising characteristic diffraction peaks having d-spacing values of about 10.03 Å, 5.91 Å, 4.35 Å, and 4.21 Å.

Clause 12. The method of clause 11, wherein the catalyst composition comprises a compound having a formula: $Co_yW_{1-x}M_xO_4$ (I), wherein M is Mo, V, or Nb; $0.5 \geq x \geq 0$; and $1 \leq y \leq 4$; and wherein the compound has an X-ray powder diffraction pattern comprising a characteristic diffraction peaks having d-spacing values of about 2.90 Å, 2.56 Å, and 1.73 Å.

Clause 13. The method of any one of clauses 11-12, further comprising reacting the catalyst composition with a chelant containing at least 10 carbon atoms in hydrothermal conditions.

Clause 14. The method of clause 13, wherein the chelant comprises an amine or an amide functional group.

Clause 15. The method of clause 14, further comprising reacting the catalyst composition with elemental sulfur.

Clause 16. The method of any one of clauses 11-15, further comprising sulfiding the catalyst composition.

Clause 17. A method comprising (i) contacting a feed with hydrogen in the presence of a catalyst composition comprising a compound having a formula $Co_yW_{1-x}M_xO_4$ (I), wherein M is Mo, V, or Nb; $0.5 \geq x \geq 0$; and $1 \leq y \leq 4$; and (ii) forming a hydrocarbon product, wherein the compound has an X-ray powder diffraction pattern comprising characteristic diffraction peaks having d-spacing values of about 2.90 Å, 2.56 Å, and 1.73 Å.

Clause 18. The method of clause 17, wherein the catalyst composition further comprises a chelant containing at least 10 carbon atoms.

Clause 19. The method of clause 18, wherein the chelant comprises an amine or an amide functional group.

Clause 20. The method of any of clauses 17-19, wherein the catalyst composition further comprises elemental sulfur.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A composition comprising a compound having a formula:

$$Co_y W_{1-x} M_x O_4 \qquad (I),$$

wherein
M is Mo;
0.5≥x≥0; and
1≤y≤4,
wherein the compound is substantially in a hexagonal phase and has an X-ray powder diffraction pattern comprising characteristic diffraction peaks having d-spacing values of about 2.90 Å, 2.56 Å, and 1.73 Å, and
wherein the X-ray powder diffraction pattern is free of diffraction peaks below a two-theta value of 18°.

2. The composition of claim 1, wherein the compound is prepared by hydrothermally reacting tungstic acid and cobalt carbonate, wherein the cobalt carbonate has an X-ray powder diffraction pattern comprising characteristic diffraction peaks having d-spacing values of about 10.03 Å, 5.91 Å, 4.35 Å, and 4.21 Å.

3. The composition of claim 1, further comprising a chelant containing at least 10 carbon atoms.

4. The composition of claim 3, wherein the chelant is an amide having at least 10 carbons.

5. The composition of claim 3, wherein the chelant contains at least 15 carbon atoms.

6. The composition of claim 3, wherein the chelant comprises an amine or an amide functional group.

7. The composition of claim 3, wherein the chelant is stearylamine.

8. The composition of claim 7, further comprising elemental sulfur.

9. A bulk catalyst composition produced by sulfiding the composition of claim 1.

10. A method of making a bulk catalyst composition comprising:
(i) combining tungstic acid, cobalt carbonate, and optionally molybdenum trioxide, and
(ii) reacting the tungstic acid, cobalt carbonate, and optional molybdenum trioxide to form a catalyst composition,
wherein the cobalt carbonate has a first X-ray powder diffraction pattern comprising characteristic diffraction peaks having d-spacing values of about 10.03 Å, 5.91 Å, 4.35 Å, and 4.21 Å,
wherein the catalyst composition comprises a compound having a formula $$Co_y W_{1-x} M_x O_4 \qquad (I),$$

wherein
M is Mo;
0.5≥x≥0; and
1≤y≤4,
wherein the compound is substantially in a hexagonal phase and has a second X-ray powder diffraction pattern comprising characteristic diffraction peaks having d-spacing values of about 2.90 Å, 2.56 Å, and 1.73 Å, and
wherein the second X-ray powder diffraction pattern is free of diffraction peaks below a two-theta value of 18°.

11. The method of claim 10, further comprising reacting the catalyst composition with a chelant containing at least 10 carbon atoms in hydrothermal conditions.

12. The method of claim 11, wherein the chelant comprises an amine or an amide functional group.

13. The method of claim 12, further comprising reacting the catalyst composition with elemental sulfur.

14. The method of claim 10, further comprising sulfiding the catalyst composition.

15. A method comprising:
(i) contacting a feed with hydrogen in the presence of a catalyst composition comprising a compound having a formula:

$$Co_y W_{1-x} M_x O_4 \qquad (I),$$

wherein
M is Mo;
0.5≥x≥0; and
1≤y≤4; and
(ii) forming a hydrocarbon product,
wherein the compound is substantially in a hexagonal phase and has an X-ray powder diffraction pattern comprising characteristic diffraction peaks having d-spacing values of about 2.90 Å, 2.56 Å, and 1.73 Å, and
wherein the X-ray powder diffraction pattern is free of diffraction peaks below a two-theta value of 18°.

16. The method of claim 15, wherein the catalyst composition further comprises a chelant containing at least 10 carbon atoms.

17. The method of claim 16, wherein the chelant comprises an amine or an amide functional group.

18. The method of claim 15, wherein the catalyst composition further comprises elemental sulfur.

19. The method of claim 15, wherein the method further comprises sulfiding the catalyst composition prior to the contacting.

* * * * *